United States Patent
Meadows et al.

(10) Patent No.: US 9,943,744 B2
(45) Date of Patent: Apr. 17, 2018

(54) DEVICE AND METHOD FOR CALCULATING GOLF STATISTICS

(71) Applicant: SkyHawke Technologies, LLC., Ridgeland, MS (US)

(72) Inventors: James W. Meadows, Madison, MS (US); Richard L. Root, Ridgeland, MS (US)

(73) Assignee: SkyHawke Technologies, LLC, Ridgeland, MS (US)

( * ) Notice: Subject to any disclaimer, the term of this patent is extended or adjusted under 35 U.S.C. 154(b) by 0 days.

(21) Appl. No.: 13/843,380

(22) Filed: Mar. 15, 2013

(65) Prior Publication Data

US 2014/0277630 A1 Sep. 18, 2014

(51) Int. Cl.
| | |
|---|---|
| *A63B 71/06* | (2006.01) |
| *G01S 19/19* | (2010.01) |
| *G01S 5/00* | (2006.01) |
| *G09B 19/00* | (2006.01) |
| *A63B 24/00* | (2006.01) |

(52) U.S. Cl.
CPC ........ *A63B 71/0619* (2013.01); *G01S 5/0045* (2013.01); *G01S 19/19* (2013.01); *G09B 19/0038* (2013.01); *A63B 2024/0025* (2013.01); *A63B 2024/0046* (2013.01)

(58) Field of Classification Search
CPC ........ A63B 2024/0025; A63B 69/3608; A63B 69/3632; A63B 69/3658; A63B 71/0619
USPC .......................................................... 700/91
See application file for complete search history.

(56) References Cited

U.S. PATENT DOCUMENTS

| | | |
|---|---|---|
| 4,142,236 A | 2/1979 | Martz et al. |
| 4,266,214 A | 5/1981 | Peters, Jr. |
| 4,367,526 A | 1/1983 | McGeary et al. |
| 4,815,020 A | 3/1989 | Cormier |
| 4,879,648 A | 11/1989 | Cochran et al. |
| 5,294,110 A | 3/1994 | Jenkins et al. |
| 5,319,548 A | 6/1994 | Germain |
| 5,426,422 A | 6/1995 | Vanden Heuvel et al. |

(Continued)

FOREIGN PATENT DOCUMENTS

| | | |
|---|---|---|
| EP | 2 243 523 A1 | 10/2010 |
| GB | 2249202 | 4/1992 |

(Continued)

OTHER PUBLICATIONS

European Office Action dated Sep. 22, 2014 in Patent Application No. 14159873.0.

(Continued)

*Primary Examiner* — Tramar Harper
*Assistant Examiner* — Anh Vo V Nguyen
(74) *Attorney, Agent, or Firm* — Oblon, McClelland, Maier & Neustadt, L.L.P.

(57) ABSTRACT

A location-aware device includes a position determination sensor that determines a position of the location-aware device. A receiver receives, from a tag coupled to a golf club, data corresponding to an output of a sensor included in the tag. A processor associates the data received from the tag with the determined position, and processes the data received from the tag to determine whether to register a golf shot as having occurred at the determined position. A memory stores a golf shot determined to be registered by the processor along with the determined position.

19 Claims, 17 Drawing Sheets

(56) References Cited

U.S. PATENT DOCUMENTS

| | | | |
|---|---|---|---|
| 8,109,816 B1* | 2/2012 | Grober | 463/3 |
| 2002/0123386 A1* | 9/2002 | Perlmutter | 473/223 |
| 2003/0207718 A1* | 11/2003 | Perlmutter | 473/221 |
| 2005/0282650 A1* | 12/2005 | Miettinen et al. | 473/221 |
| 2006/0025229 A1* | 2/2006 | Mahajan et al. | 473/131 |
| 2009/0017944 A1* | 1/2009 | Savarese et al. | 473/407 |
| 2009/0209358 A1* | 8/2009 | Niegowski | 473/223 |
| 2009/0280921 A1* | 11/2009 | Rankin | 473/199 |
| 2010/0099509 A1* | 4/2010 | Ahem | A63B 57/00 473/221 |
| 2011/0028230 A1 | 2/2011 | Balardeta et al. | |
| 2011/0224025 A1* | 9/2011 | Balardeta et al. | 473/407 |
| 2011/0230986 A1* | 9/2011 | Lafortune et al. | 700/93 |
| 2011/0305369 A1* | 12/2011 | Bentley | G06K 9/00342 382/103 |
| 2012/0015752 A1 | 1/2012 | Balardeta et al. | |
| 2012/0035003 A1* | 2/2012 | Moran et al. | 473/407 |
| 2012/0050529 A1* | 3/2012 | Bentley | 348/139 |
| 2012/0115626 A1* | 5/2012 | Davenport | 473/223 |
| 2012/0142443 A1* | 6/2012 | Savarese et al. | 473/199 |
| 2012/0244969 A1* | 9/2012 | Binder | 473/570 |
| 2013/0079170 A1* | 3/2013 | Balardeta et al. | 473/222 |
| 2013/0095939 A1 | 4/2013 | Meadows et al. | |
| 2013/0095940 A1* | 4/2013 | Dugan | 473/222 |
| 2013/0144411 A1* | 6/2013 | Savarese et al. | 700/91 |
| 2013/0203518 A1* | 8/2013 | Hatton et al. | 473/223 |
| 2014/0094942 A1* | 4/2014 | Tarde et al. | 700/91 |
| 2014/0213382 A1* | 7/2014 | Kang et al. | 473/223 |

FOREIGN PATENT DOCUMENTS

| | | |
|---|---|---|
| JP | 5-49724 | 3/1993 |
| WO | 92/04080 | 3/1992 |
| WO | 94/04982 | 3/1994 |
| WO | WO 2011/057194 A1 | 5/2011 |

OTHER PUBLICATIONS

Extended European Search Report dated Jul. 1, 2014 in Patent Application No. 14159873.0.

Jack Nicklaus' Greatest 18 Holes of Major Championship Golf, Players Guide for Commodore 64/128 version by: Ken Moore, (24 pp.) (1988).

Game Boy, Nintendo, Ultra Golf (23 pp.) (1992).

Turbo Tax User Manual Version 10.0 ChipSoft (98 pp.) (1992).

Sony Video Cassette Recorder Operating instructions 1990 (60 pp.).

Scoremaster 1981 by Eagle Scoremaster, Inc. (32 pp.).

PGA Tour Golf Instruction Booklet Licensed by Nintendo (21 pp.) (1991).

How to Play Jack Nicklaus' Greatest 18 Holes of Major Championship Golf, Konami, Licensed by Nintendo (11 pp.) (1989).

Examiner's Communication dated Nov. 28, 2017 in corresponding European Patent Application No. 14159873.0.

\* cited by examiner

DEVICE AND METHOD FOR CALCULATING GOLF STATISTICS

BACKGROUND

Field of the Disclosure

The present disclosure relates to a method and apparatus for registering a golf shot based on a processing of outputs of one or more sensors affixed to a golf club and reporting the sensor outputs to a portable location aware device, which then determines whether to register a golf shot at a location associated with the sensor outputs.

Description of the Related Art

In the game of golf, it is desirable for a player to have accurate distance measurements corresponding to a golf hole before taking a shot. For example, a player may wish to know the distance from his or her current location to the front and back portions of a hazard; to the end of a fairway; or to the front, middle and back portions of the green. Previously, it was necessary for a player to estimate these distances by using markings on the course and/or a yardage book indicating distances between various points on the course.

However, the use of portable location aware electronic devices has become common in the game of golf to ascertain distances from a player's current position to various features on a course. These location aware devices are typically in the form of a handheld computing device that may be capable of displaying an outline of a golf hole and distances from the location aware device to the various features on the golf hole. These devices are also configured to allow a user to manually enter and track various statistics related to a round of golf. For example, the user may manually enter a hole-by-hole score into the location aware device, manually record a location of a shot, or manually record a club used for a particular shot.

However, the drawback to tracking statistics using these devices is that the user must manually enter these statistics. For example, in order to track a round shot-by-shot, the user must manually enter data into the device each time a shot is taken. Such a process is time-consuming, distracting, and takes away from a player's enjoyment of the round of golf.

More recently still, devices attached to a golf club that measure actual ball strikes have been proposed; however, such devices generally require more costly sensors and advanced programming to detect actual ball strikes and to filter out false positives that may occur (e.g., when the golf club hits the ground or an object other than a golf ball).

SUMMARY

In view of the above noted shortcomings in manually tracking statistics in a portable location aware device, the inventors derived a system that allows for golf statistics to be automatically calculated and stored by a location aware device. The inventors' system also automatically deems a ball strike to have occurred without the use of costly external sensors and filtering such that accurate scoring statistics can be automatically determined.

More particularly, aspects of the present disclosure describe a system configuration in which a golf shot is automatically detected based on at least a golf club's detected movement, location, and/or an "active" status of the club. Data relating to the detected shot can be stored in the location aware device without the need for user intervention.

An exemplary system configuration may include an electronic "tag" coupled to a golf club. The tag may include one or more sensors, which may be configured to output a signal based on a detected movement of the golf club. The tag may include a controller configured to compare each of the sensor outputs to stored reference sensor output values. Additionally, the tag may be equipped with a transceiver configured to transmit data corresponding to the sensor outputs to the location aware device. The location aware device can process the information received from the tag to determine whether a shot should be registered at a location.

In a non-limiting example, this determination may be based on a multiple factors, such as a movement detected by the tag, a movement of the location aware device, a user input received by the location aware device, or any combination thereof. In this example, a swing may be detected at a particular location followed by geo-spatial movement of the location aware device (e.g., due to the golfer walking to the next ball position). This combination of inputs likely corresponds to a successful golf shot being performed, which consequently may be registered in the location aware device and used for automatic shot distance calculations and scoring.

In another aspect of the present disclosure, the system configuration may include a processor unit that is remote from the location aware device, wherein the location aware device stores the information received from the tag for later transmission to a remote processor unit. The information received from the location aware device may then be analyzed by the remote processor unit to determine whether a shot should be registered at a location.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
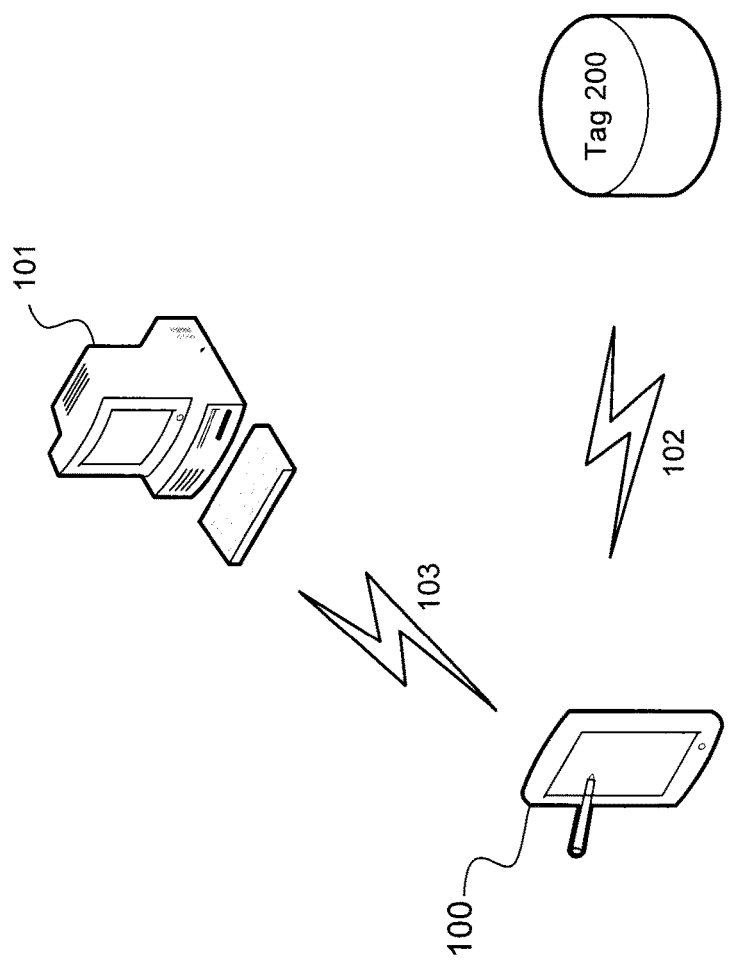
FIG. 1A illustrates an exemplary communications flow path of a location aware device, a tag, and a remote processing unit.

Aspects of the present disclosure will now be described below with reference to the drawings, wherein like reference numerals designate identical or corresponding parts throughout several views.

As used hereafter, the terms "club swing event," "club swing," and "swing" are used interchangeably to mean a swing of the golf club. Further, the term "deemed ball strike" and "shot" are used to describe a golf swing that results in positive contact with a golf ball. Shots are mainly described herein with regard to automatic statistics calculations stemming from deemed ball strikes, such as automated scoring.

Turning to the drawings, FIG. 1A is a diagram of an exemplary system that includes a location aware device 100, a tag 200, and a remote processing unit 101. The location aware device 100 receives outputs from the tag 200 over a signal path 102. The outputs from the tag 200 may include raw sensor outputs resultant from a movement of the tag 200. Additionally, the location aware device 100 may be configured to display various information relating to a golf course. For example, the location aware device 100 may display layouts of a golf hole, a geospatial Global Positioning System (GPS) location of the device on the course, score information, shot distance information, green layouts, and other similar information that is pertinent to a round of golf.

The tag 200 may include one or more sensors that may, e.g., be used to determine various movement characteristics of a golf swing. The tag 200 may be affixed to a golf club and the sensors may provide data which may be used to determine, e.g., a movement of the club, a GPS location of the club, or an "active" status indicating, e.g., whether the club is presently stored within a golf bag. The tag 200 may transmit raw sensor data to a location aware device 100, or it may process the sensor data locally and transmit the processed data to the location aware device 100. Such transmission may be performed via the signal path 102 through use of an RF transceiver included on the respective devices.

In one aspect of the present disclosure, the location aware device 100 may transmit received raw sensor data and/or data which is processed by the location aware device 100 to the remote processing device 101 using, e.g., a Wi-Fi interface via signal path 103. The data received by the remote processing unit 101 may be used, e.g., for display, analysis, further processing, or later retrieval. For example, the remote processing unit 101 may process raw sensor data to calculate golf statistics, which would be made available to a user via remote processing unit 101's connection to a Web server. The remote processing unit 101 may be a general purpose computer, a tablet computer, a handheld device, a smart phone, or other such device capable of performing processing according to the present disclosure.

While the exemplary communications path described in connection with FIG. 1A respectively employs a Wi-Fi interface and RF transceiver within the location aware device 100 and the tag 200 to transmit data between various elements, it should be appreciated that such transmission can occur via any wireless or wired communications path. Further, while FIG. 1A illustrates an embodiment that includes the remote processing unit 101, it is to be understood that an embodiment without a remote processing unit is also within the purview of the present disclosure. In particular, any processing features described herein can be executed individually by the location aware device 100, the tag 200, the remote processing unit 101, or any combination thereof.

Aspects of the location aware device 100 of FIG. 1A will now be described in greater detail with respect to FIG. 1B.

Figure 1B:
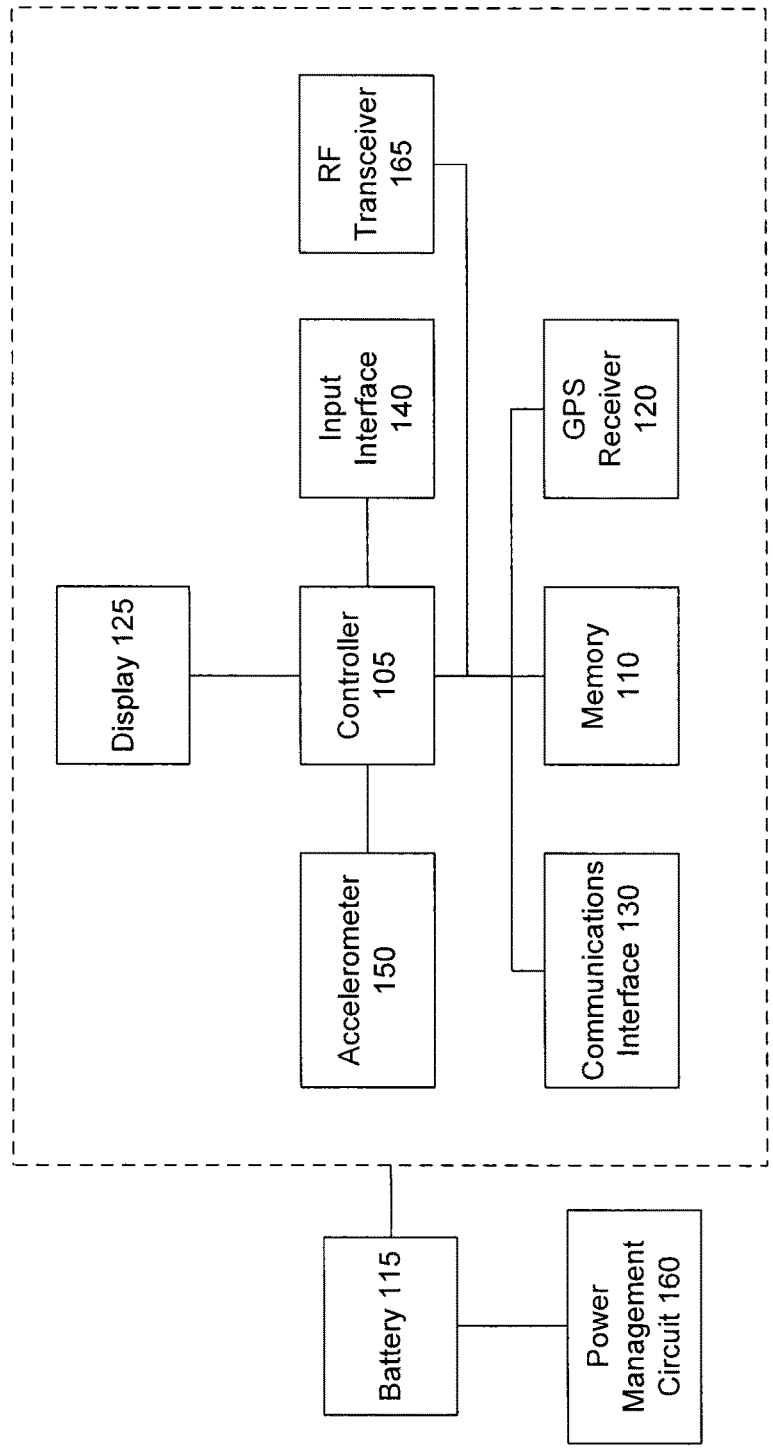
FIG. 1B is a block diagram showing an exemplary configuration of a location aware device.

FIG. 1B is a block diagram showing an exemplary configuration of the location aware device 100. As shown in the figure, the location aware device 100 may include multiple components that are managed by a controller 105. The controller 105 serves as an interface for a plurality of hardware systems and device application systems of the location aware device 100. The controller 105 can be any type of processor that interprets and executes instructions, such as software stored in a non-transitory computer readable memory. The memory may, e.g., be a flash memory or a random-access memory (RAM), and is represented in FIG. 1B as memory 110. An operating system executed by the controller 105 may also utilize the onboard memory 110 for storage of temporary data.

The location aware device 100 may store map data (e.g., actual or rendered golf course maps) in the memory 110. The stored map data may be referenced by GPS receiver 120, which provides real-time data corresponding to a current location of the location aware device 100. The map data can be updated via a communications interface 130, which may be a Universal Serial Bus (USB) port, a Wi-Fi transceiver, or other communications interface capable of performing communications via known protocols. The map data may also be updated via a disk, such as a micro-Secure Digital (micro-SD) card, or other similar input device. The controller 105 may process the GPS data and derive calculations to the mapped points and various areas on the course. Using the GPS data provided by the GPS receiver 120 and the map data stored in the memory 110, the location aware device can output current location and shot distance information to a user via a display 125. For example, the controller 105 may calculate a distance from a particular point on a golf course where a user is standing via the GPS receiver 120, and utilize this information to determine the remaining distance to the hole's pin via coordinates stored in the map data.

The display 125 is preferably is a sunlight readable display, such as a color thin-film transistor (TFT) liquid crystal display (LCD) having a light-emitting diode (LED) backlight. The LED backlight can be controlled by a photosensor that measures ambient light and adjusts the brightness of the backlight accordingly. The display 125 can be of a transflective type so the backlight brightness is reduced when the unit is in sunlight and the brightness is increased when the unit is in low light conditions. The display 125 may be a touch screen display capable of detecting movement and/or contact between the screen and an input instrument (e.g., a user's finger or stylus). The display 125 touch screen may detect the input instrument movement or contact via various methods, such capacitive, optical, resistive, and acoustic touch screen technologies.

The controller 105 may additionally receive input from a user via an input interface 140. The user input may correspond to a command to move a cursor on a graphical user interface (GUI), a command to enter data, a command to select a particular course for display, etc. The input interface 140 may, e.g., detect inputs from various external buttons, such as power control, volume control, a character input keyboard, and the like.

The exemplary device of FIG. 1B includes an onboard accelerometer 150 that determines an orientation of the location aware device 100 and measures acceleration of the device along a vector. In a non-limiting example, the axis orientation and acceleration information calculated by the accelerometer 150 is used by the controller 105 to rotate the course data displayed via the graphical user interface on the display 125. This feature allows the displayed course map to align with the user's orientation with respect to a particular hole. The accelerometer 150 may also detect a movement (i.e., a velocity or speed) of the location aware device 100. The detected movement may be used as an input when determining whether a golf shot has occurred, as will be discussed in further detail in later paragraphs.

The exemplary location aware device 100 is powered by a battery 115 that is managed by a power management circuit 160. The battery 115 may be a lithium ion battery, or other suitable power source for portable devices. Alternative power sources, such as solar, piezo electronics, and electromechanical induction units may also be employed to power any device described in the present disclosure.

The exemplary location aware device 100 also includes a radio-frequency (RF) transceiver 165 that transmits (receives) signals to (from) other external devices, such as the tag 200. Exemplary inputs received via RF transceiver 165 include a club tag ID, a tag battery status, raw sensor outputs, and/or other sensor data indicating the tag 200 is in a particular operational state. Data transmitted from the tag 200 and received by the RF transceiver 165 is processed by the controller 105 to record, e.g., an ID of the club being used, the current position of the location aware device, the time at which the data was collected, club swing data, or whether there is an indication of a deemed or assumed ball strike with the golf club associated with the tag 200. This data can be stored in the memory 110 and be used by the controller 105 to, e.g., automate the scoring process, alert the user when a club has been left behind, display the round and/or shot data graphically on the device, or to upload the data to a remote computer (e.g., remote processing device 101) and/or website for post-round analysis and/or graphical tracking of the user's golf shots over the course of a round. The more specific details regarding the various states of the tag 200 and the data transmitted from such tags are discussed in detail in later paragraphs.

The foregoing description of the location aware device 100 is just one example of a location aware device consistent with the present disclosure, and other configurations of a location aware device that provide the functions of receiving external sensor data, associating a location position and time to the received sensor data, storing and/or processing the received sensor data, and displaying and/or transmitting the raw or processed sensor data to a remote processing unit are also consistent with the present disclosure. Examples of the location aware device 100 that are consistent with the present disclosure include the SkyCaddie models SGX and SGXw by SkyHawke Technologies, LLC d/b/a SkyGolf. However, the location aware device 100 may also be embodied by a general purpose computer, a tablet computer, or a smart phone.

Next, aspects of the tag 200 will be described in detail with respect to FIG. 2.

Figure 2:
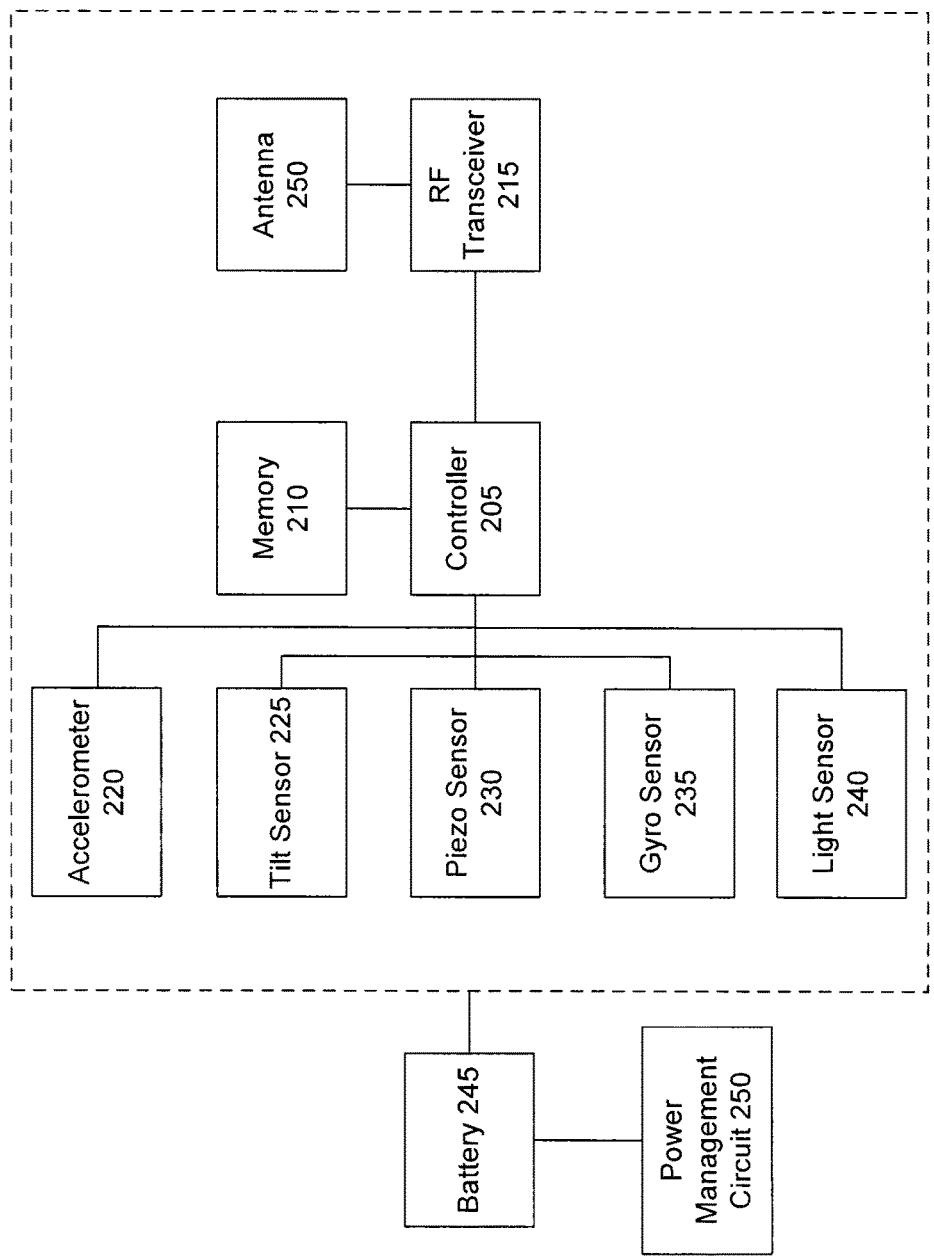
FIG. 2 is a block diagram showing an exemplary configuration of a tag.

FIG. 2 is a block diagram showing an exemplary configuration of the tag 200. The tag 200 is ideally a small format miniaturized circuit that is water-resistant and ruggedized. When used in conjunction with a golf club, the tag 200 is preferably mounted to the end of the club grip or internal to the upper portion of the club shaft. Other mounting positions on the golf club should also be considered within the scope of the present disclosure, such as anywhere on or along the shaft of the golf club. However, the tag should preferably be mounted on or within the club so as to not unduly affect a swing of the club by the golfer.

The exemplary tag 200 includes a controller 205 that executes applications stored in a memory 210. The applications may process outputs from various sensors of the tag 200 and relay the processed output data to the location aware device 100. The controller 205 may be any type of processor that interprets and executes computer readable instructions.

The tag 200 of FIG. 2 includes an RF transceiver 215 that communicates with other external devices, such as the RF transceiver 165 of the location aware device 100 shown in FIG. 1B. Further, the RF transceiver 215 may communicate with other transceivers as part of an ad-hoc network in order to relay device status and other information to a receiving device via other tags on the network. The RF transceiver 165 in the location aware-device 100 and the RF transceiver 215 in the tag 200 may be 2.4 GHz transceivers. However, various other wireless transceiver arrangements may be implemented without departing from the scope of the present disclosure.

As shown in FIG. 2, the tag 200 may also include an antenna 250, which may be an internal or external antenna used by the transceiver 215 for communication with other elements and devices.

The exemplary tag 200 also includes one or more solid state or micro-electro-mechanical (MEM) sensors that are used in the process of detecting whether a deemed ball strike event has occurred. For example, the tag 200 may be affixed to a golf club and the MEM sensor outputs resultant from the various forces imparted upon the tag 200 during a golf swing may be analyzed to determine whether the outputs correspond to an actual ball strike or to a false positive event (e.g., a practice swing in which the ball is not struck).

Additionally, the deemed ball strike analysis may include correlating the tag's MEM sensor outputs with the various data collected and stored in the location aware device 100. For example, MEM sensor outputs received during a golf swing may be analyzed in conjunction with outputs from the GPS receiver 120 in the location aware device 100. In this case, the detection of a swing by the MEM sensors, combined with the detected movement of the location aware device 100 from one position on a golf course to another is a likely indication that an actual ball strike has occurred and the golfer has begun walking to the new ball position. Thus, a deemed ball strike can be registered and scoring data can be automatically updated on the location aware device 100.

Moreover, sensor data from the accelerometer 150 of the location aware device 100 may be analyzed in conjunction with the GPS data from GPS receiver 120 and any of the sensor data from the tag 200 to perform deemed ball strike processing. For example, sensor data output by the tag 200's MEM sensors may be indicative of a golf swing, while the accelerometer 150's output may indicate movement stemming from a golfer's hip rotation during a golf swing (i.e., in the case where the location aware device is maintained on golfer's body during the swing). Thus, the combination of MEM sensor outputs and the accelerometer 150 output indicate a swing event has likely occurred.

Turning back to FIG. 2, exemplary MEM sensors that may be included in the tag 200 are shown in the figure as accelerometer 220, tilt sensor 225, piezo sensor 230, gyro-sensor 235, and light sensor 240. Aspects of these exemplary sensors will be described in greater detail below.

Accelerometer 220 senses vector motion pertaining to, e.g., a golf club swing. The tilt sensor 225 detects a vertical or horizontal orientation of, e.g., a golf club to which the tag 200 is attached. Piezo sensor 230 may also be provided in the tag 200 to detect a rapid vibration event, such as a golf club making contact with a golf ball. Gyro-sensor 235 is provided in the tag 200 to detect a rotational velocity and/or direction of, e.g., a golf club to which the tag 200 is attached. The tag 200 may also include a light sensor 240, which detects an amount of light incident on the tag 200. As discussed in more detail in later paragraphs, the light sensor 240 may be used, e.g., to determine whether a golf club is presently stored in a golf bag, and/or may be used to determine whether a swing of a golf club has occurred.

It should be appreciated that the above-described sensors may be used individually or any combination thereof. Further, one of ordinary skill in the art may incorporate additional sensors into the tag 200 depending upon, e.g. a particular application/activity in which the tag 200 is used. Moreover, certain electronic MEM components can have functions that may be combined onto one chip and sensor package, which may serve multiple purposes. For example, the accelerometer 220 may be configured to provide various degrees of tilt data in addition to acceleration data. This same electronic component may then be configured to also include a gyro sensor and a "tap" sensor, thereby reducing the number of components needed on a circuit board. Optionally, the sensor components can be designed into a custom electronic chip that integrates all of the sensor functions of individual components. This would have the advantage of simplifying the circuitry on the tag and providing better power management and battery life on the tag 200.

The onboard controller 205 shown in FIG. 2 processes and analyzes analog waveform and digital signal profile outputs from the above-described sensors to determine if the outputs match a pattern of data indicating a club swing. These sensor outputs may include whether a club is first in an "active" state and, thus, ready for a club swing and shot. As discussed in further detail in later paragraphs, the outputs from each of the sensors may be compared against certain signal "signatures" and/or thresholds stored in the memory 210 to determine whether a club swing event or shot has occurred. These signatures, or pattern data, may be updated as the system learns what data indicates a club swing and what data does not indicate a club swing. In this manner, the tag 200 may self-learn over a period of time so as to increase the accuracy of detecting when a true club swing event occurs (i.e., a swing motion combined with a deemed ball strike). The thresholds and parameters can be updated in the memory 210, e.g., via an input through the RF transceiver 215. Additionally, the data can be configured and sent by the location aware device 100 to optimize the tag's sensor processing parameters.

Further, additional sensor data may be input to the controller 205 to indicate club position and/or state, verify a club swing, or aid in the refinement of signal patterns indicating a club swing. This other sensor data may be provided from additional sensors, such as shock sensors that output an indication of a shock event (e.g., a ball strike) without the use of piezo sensors, and/or solid state or position sensors that indicate an orientation of the club. This additional sensor data could also be incorporated into profile data patterns.

The components of the tag 200 are powered by a battery 245, which is controlled by a power management circuit 250. The power management circuit 250 manages the power output from the battery 250 to the components of the tag 200, and is capable of reporting a status of the power remaining in the battery to the controller 205.

A piezo vibration damper could be incorporated into the tag 200 system to convert mechanical motion and vibration into electrical energy. If this component is mounted internal to the grip and/or club shaft, it would have the effect of dampening vibrations from striking the ball. The electrical energy resultant from the motion and vibrations may be stored in a capacitor included in the battery 245 and power management circuit 250, or may be used to charge the battery 245 directly. Typically a piezo device would be composed of a material having piezo-electric properties and incorporated on a flexible polymer substrate. The design of the piezo vibration damper preferably would fit into the section of the club comprising the grip and/or the internal section of the club shaft. The piezo vibration damper would preferably be connected to a circuit that would capture and store the electrical energy derived from the mechanical and vibration motions of the club shaft.

Figure 3:
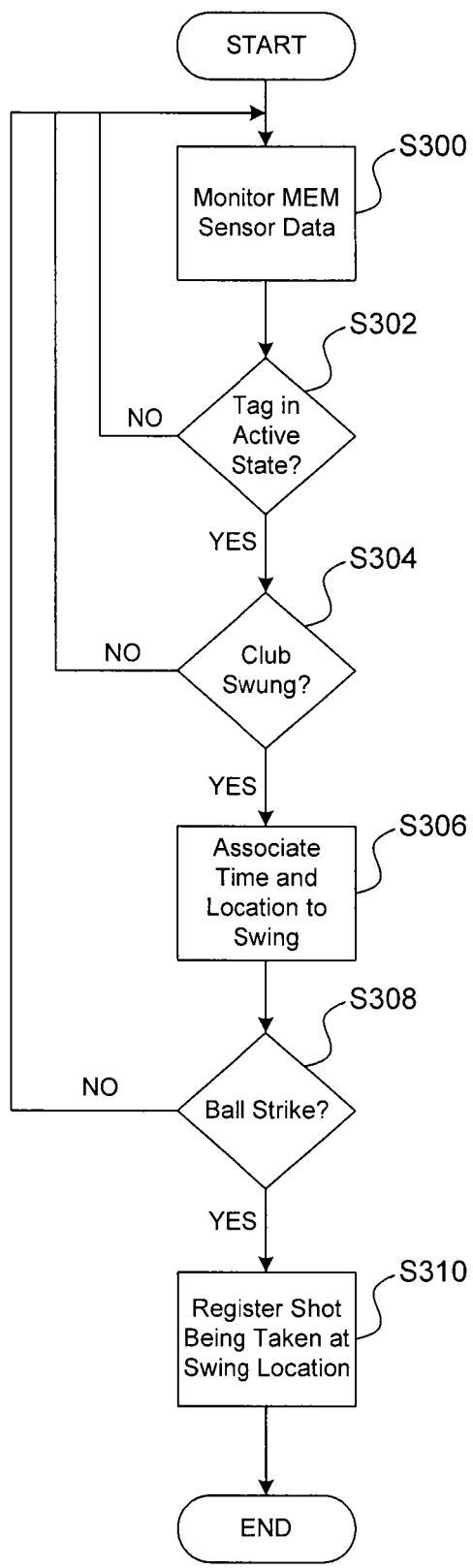
FIG. 3 is a flow chart outlining an exemplary process of detecting and processing motion dynamics of a club using a tag.

Next, FIG. 3 is a flow chart outlining the overall process of determining whether a golf swing should be registered as a deemed ball strike.

The exemplary process of FIG. 3 starts at S300 by collecting data from one or more of the MEM sensors included in the tag 200 of FIG. 2. The sensor data will be characteristic of the data collected by each respective sensor. For example, the sensor data may include multiple outputs, such as x-axis, y-axis, and z-axis data of an accelerometer or gyro sensor; or single outputs, such as the amount of light detected by a light sensor.

The MEM sensor data collected at S300 is used to perform an "active" state determination for the tag 200 at step S302. The state determination of S302 will be described in greater detail with respect to FIG. 4A.

Figure 4A:
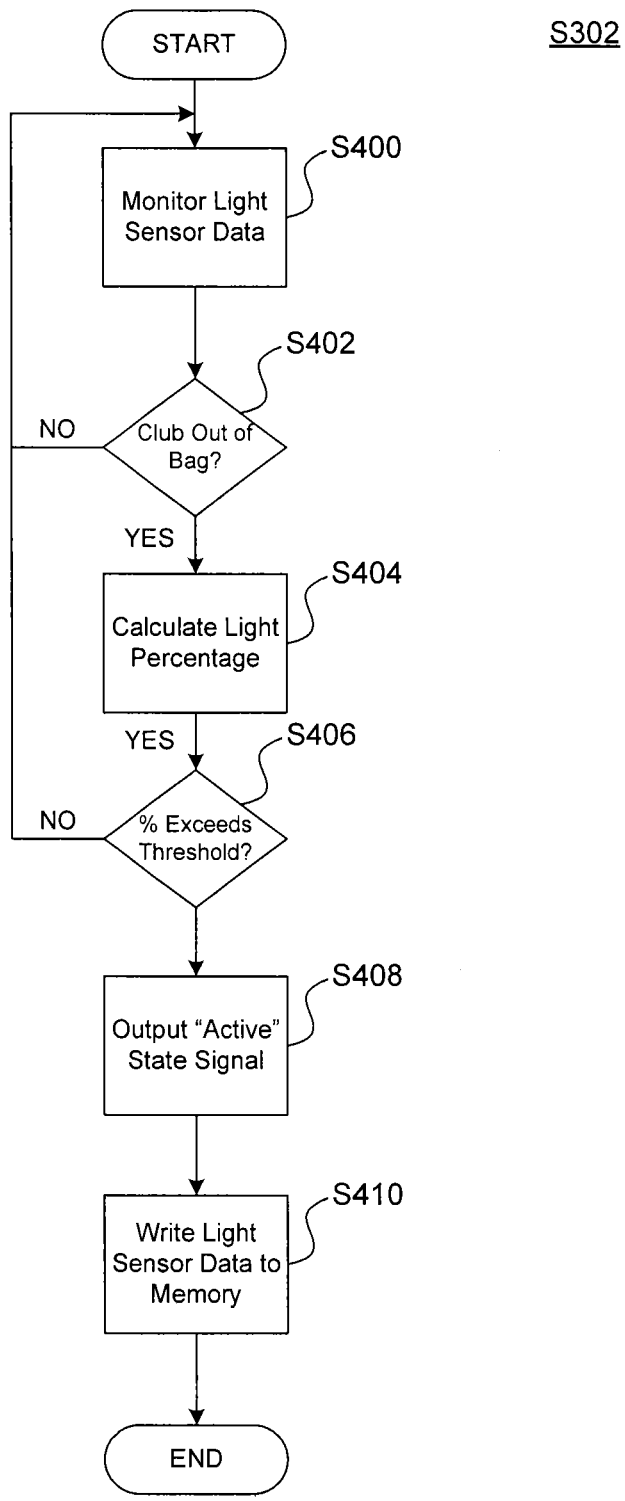
FIGS. 4A and 4B are flow charts showing exemplary processes of determining an active state of a tag.

Referring to FIG. 4A, the exemplary state determination process starts at S400 with the controller 205 of the tag 200 monitoring a status of one or more sensors of the tag 200 to determine if the club has been removed from the user's bag. It is important to know when a tag is "inactive" and when it is in an "active" state so that data is not unnecessarily (i.e., continuously) transmitted from the tag 200 when the club is inactive. Such a determination also allows the controller 205 to conserve power in the tag battery 245 by controlling the power management circuit 250 to reduce or eliminate supplied battery power when the club is not being used.

In the non-limiting example of FIG. 4A, data received from the light sensor 240 is used to trigger the controller 205 to perform the state determination processing. In this example, the controller 205 at step S402 analyzes the light data and determines if the club has gone from a dark state (e.g., in a golf bag) to a light state (e.g., out of golf bag). This club state determination may be made, e.g., by determining when the level of light detected by the light sensor 240 exceeds a predetermined threshold. The threshold value may be stored in advance in the memory 210.

If the output does not exceed a threshold value (i.e., the club is still in a dark state because it is stored in a golf bag), the controller 205 continues to monitor the light data output from the light sensor 240. When it is determined that the light data exceeds the threshold value (i.e., the club is out of the bag), the microcontroller 205 calculates at step S404 a percentage value of the light data with respect to a maximum reference output value of the light data and determines at step S406 whether this percentage is greater than a threshold percentage. If the percentage does not exceed the threshold percentage (i.e., the level of light is not sufficient enough to indicate that the club has been removed from the bag), the microcontroller 205 continues to monitor the light data output from the light sensor (S400). Otherwise, when it is determined that the calculated percentage exceeds the threshold percentage, the controller 205 outputs a signal indicating the club is "active" and writes the calculated percentage to the memory 210 at steps S408 and S410, respectively.

Table 1 includes exemplary values for light sensor output in units of lux and percentage that may be used to determine various states of the tag 200, such as in the exemplary processing of FIG. 4A. Percentage values in Table 1 are based on a reference illuminance of 120 lux or greater for bright light. The values of Table 1 are not limiting, and the microcontroller 205 can easily be adapted to accept alternate values when performing a state determination based on a light sensor input.

TABLE 1

Exemplary Light Sensor Values

| State Description | Lux | Percentage |
|---|---|---|
| Wake Up | 5 | 4% |
| Out of Bag | 20 | 17% |

In another aspect of the present disclosure, the state determination processing may be performed using the tilt sensor 225 rather than the light sensor 240. An exemplary process of acquiring and analyzing the tilt sensor data to perform the state determination processing of step S302 is described below with reference to the exemplary flow chart shown in FIG. 4B.

Figure 4B:
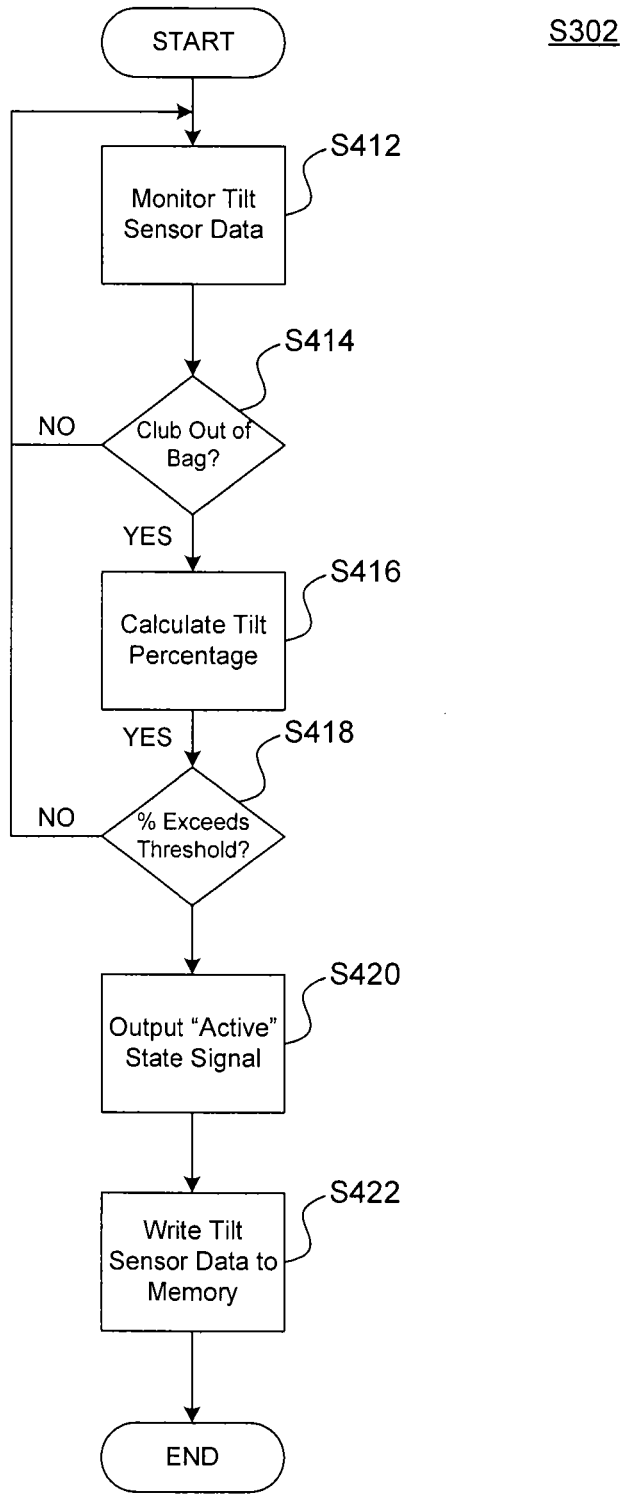

Referring to FIG. 4B, the controller 205 at step S412 analyzes the tilt sensor 225 data and determines at step S414 whether the club is removed from the golf bag, based on the tilt sensor 225 data. For example, the tilt sensor 225 data can be compared to a predetermined tilt threshold indicating the club is removed from the bag. In addition to comparing the tilt sensor 225 data with the threshold, the controller 205 may also compare tilt sensor data between multiple golf clubs by exchanging data via transceiver 215. Because every club in a golf bag should indicate substantially the same tilt value (i.e., the clubs are all stored upright in a similar manner), comparing tilt sensor data between multiple clubs allows the controller 205 to determine whether a particular tilt value is inconsistent with the other clubs. An inconsistent tilt value would indicate that the club is not aligned with the remaining clubs, which is likely caused by removing the club from the golf bag.

If the tilt sensor 225 output does not exceed the predetermined threshold value at S414 (i.e., the club is not sufficiently tilted), the controller 205 continues to monitor the tilt data. Otherwise, when it is determined that the tilt sensor 225 output exceeds the threshold value, the controller 205 then calculates a tilt percentage value with respect to a maximum reference output value of the tilt sensor and determines whether this percentage is greater than another predetermined threshold value (steps S416 and S418). If the percentage does not exceed the threshold percentage (i.e., the club is not sufficiently tilted), the controller 205 continues to monitor the tilt sensor output. Otherwise, when it is determined at S418 that the calculated percentage exceeds the threshold percentage, the controller 205 outputs a signal indicating the tag 200 is in an active state and writes the percentage to the memory 210 (steps S420 and S422). Tables 2 and 3 include exemplary values for tilt sensor angular and percentage outputs that may be used to determine various states of the tag 200, such as in the exemplary processing of FIG. 4B. Tables 2 and 3 respectively show angle and percentage values for golf bags that will not be laid horizontally during play (e.g., bags that are stored upright in a golf cart), and bags that may be laid horizontally during play (e.g., bags that will be carried by the golfer). The controller 205 may be configured to automatically switch modes of detection based on bag usage, or the controller 205 may select the appropriate table based upon an input indicating bag usage. For the purposes of the exemplary tables, an angle of zero degrees indicates the club head is aligned with the vertical axis pointing straight up, 180-degrees indicates the club head is pointed straight down, and 90-degrees indicates the club is horizontal.

Percentage values in Tables 2 and 3 are based on a reference angle of 180-degrees. The values of Tables 2 and 3 are not limiting, and the microcontroller 205 can easily be adapted to accept alternate values when performing a state determination based on a tilt sensor input.

TABLE 2

Exemplary Tilt Sensor Values (Bag Remains Vertical)

| State Description | Angle | Percentage |
|---|---|---|
| In Bag | 0-90 | 0-50% |
| Out of Bag | 91-180 | >50% |

TABLE 3

Exemplary Tilt Sensor Values (Bag May Be Horizontal)

| State Description | Angle | Percentage |
|---|---|---|
| In Bag | 0-108 | 0-60% |
| Out of Bag | 109-180 | >60% |

The above-described exemplary processes serve as a determination that a club has been removed from a golf bag, and act as a trigger for the tag 200 to "wake up" and actively process outputs from other sensors of the tag. The detection of a change to an active state may also result in the controller 205 sending an active status signal to the location aware device 100 indicating the club is in an active state. This transmitted information may include a unique ID corresponding to the club to which the tag 200 is attached. As discussed above, this unique ID may specifically identify the club, or it may include some other type of information that is specific to the tag, which the location aware device 100 may use to correlate the tag with a particular club. After receiving an active status signal, the location aware device 100 may display an indication to a user that a specific club has been selected for a swing/shot. The location aware device 100 may also associate its current GPS location with the club ID, which can be used as part of the lost club function described in later paragraphs.

The exemplary active state determinations illustrated in FIGS. 4A and 4B are made locally at the tag 200 via the controller 205 analyzing received motion dynamic data output by the tag's MEM sensors. Alternatively, the controller 205 may also be configured to control the transceiver 215 and output the motion dynamic data output from the MEM sensors to the location aware device 100. In this case, the controller 105 of the location aware device 100 similarly processes the received data to determine whether the club is in an active state.

Additionally, while percentages are used in the above-described example, it should be appreciated that other known units of measuring light intensity and/or tilt may easily be substituted for performing the above club state determination.

Further, while a club state determination is respectively made using a light sensor and a tilt sensor in the examples of FIGS. 4A and 4B, various other sensor outputs, either individually or in combination, may be processed by the controller 205 in order to make a determination that the club is active. Examples of these sensor outputs may include outputs of the accelerometer 220, the gyro sensor 235, or the piezo sensor 230.

Moreover, the state determination process may be performed based on a combination of data from two or more sensors. For example, the tag 200 may be configured to transition from the inactive state to the active state by monitoring one of the detected light value or the detected tilt value of the club. On the other hand, the controller 205 of the tag 200 may monitor both attributes and transition to an active mode only after both of the sensed tilt data and the light data exceed their respective threshold values.

In addition to determining an active state, one of ordinary skill may alter the above-described state determination processes to determine when a club has been returned to the bag after it has been in an active state (i.e., when the club is inactive). For example, the controller 105 of location aware device 100 may interpret an absence of an active status signal from the tag 200 as an indication that the tag 200 is inactive. In the case that the club has been active but has been returned to the bag, the tag 200 may also send an indication to the location aware device 100 that the club is inactive. The location aware device 100 may utilize inactive state information to perform automatic scoring calculations, deemed ball strike determinations, and lost club processing.

Figure 9:
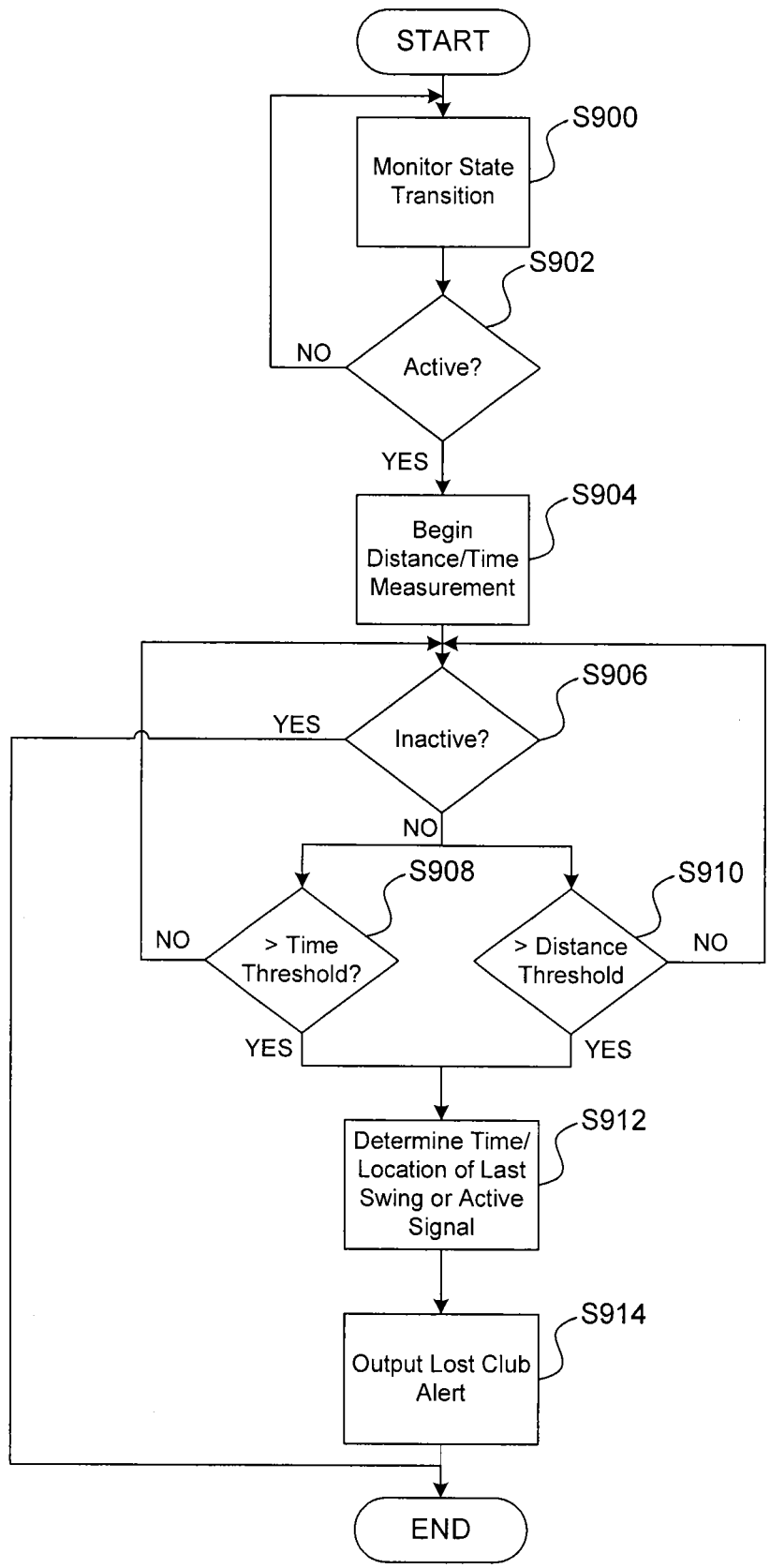
FIG. 9 is an exemplary flow chart illustrating a lost club determination.

As a non-limiting example, FIG. 9 illustrates a flow chart for detecting and locating a lost club using the above-described active state determination.

Referring to FIG. 9, the location aware device 100 at step S900 monitors for outputs indicating the tag 200 has transitioned to an active state (S902). The transition determination at S900 may be performed by detecting an active signal and/or data written to memory in FIGS. 4A and 4B. If the tag 200 is not active, the location aware device 100 continues monitoring for the state transition. Otherwise, if the tag 200 is determined to be active at step S902 the location aware device 100 at step S904 logs the time and location at which the tag 200 transitioned to the active state and begins measuring the time elapsed and/or distance traveled from the respective logged reference values. The elapsed time and/or distance traveled is then compared to a set of predetermined thresholds. If at any time prior to the time and/or distance exceeding their respective thresholds the tag 200 is detected as inactive, then the process ends (step S906). Otherwise, if at steps S908 and S910 either of the thresholds are exceeded prior to the tag 200 transitioning back to an inactive state, the location aware device 100 at step S912 determines the time and location at which the tag 200 transitioned to active. Additionally, the location aware device 100 may determine the time and location of any subsequent detected swings following the active state transition. Using the last known time and location of active state transition and/or the last detected swing, the controller 105 outputs a lost club alert on the display 125 at step S914. Thus, the golfer is alerted of (1) the potential that a club is lost, and (2) a likely location of the club at a certain time. Accordingly, the golfer can utilize this information to retrieve the club.

Turning back to FIG. 3, if at S302 no determination is made that a club is in an active state, or a if a determination is made that a club once in an active state is no longer in an active state, the club swing monitoring process continues at S300. Otherwise, if a determination is made that a club is in an active state, a determination is then made at S304 as to whether the active club has been swung.

Exemplary processing related to determine whether a swing event has occurred will now be explained in further detail with respect to FIGS. 5A and 5B.

Figure 5A:
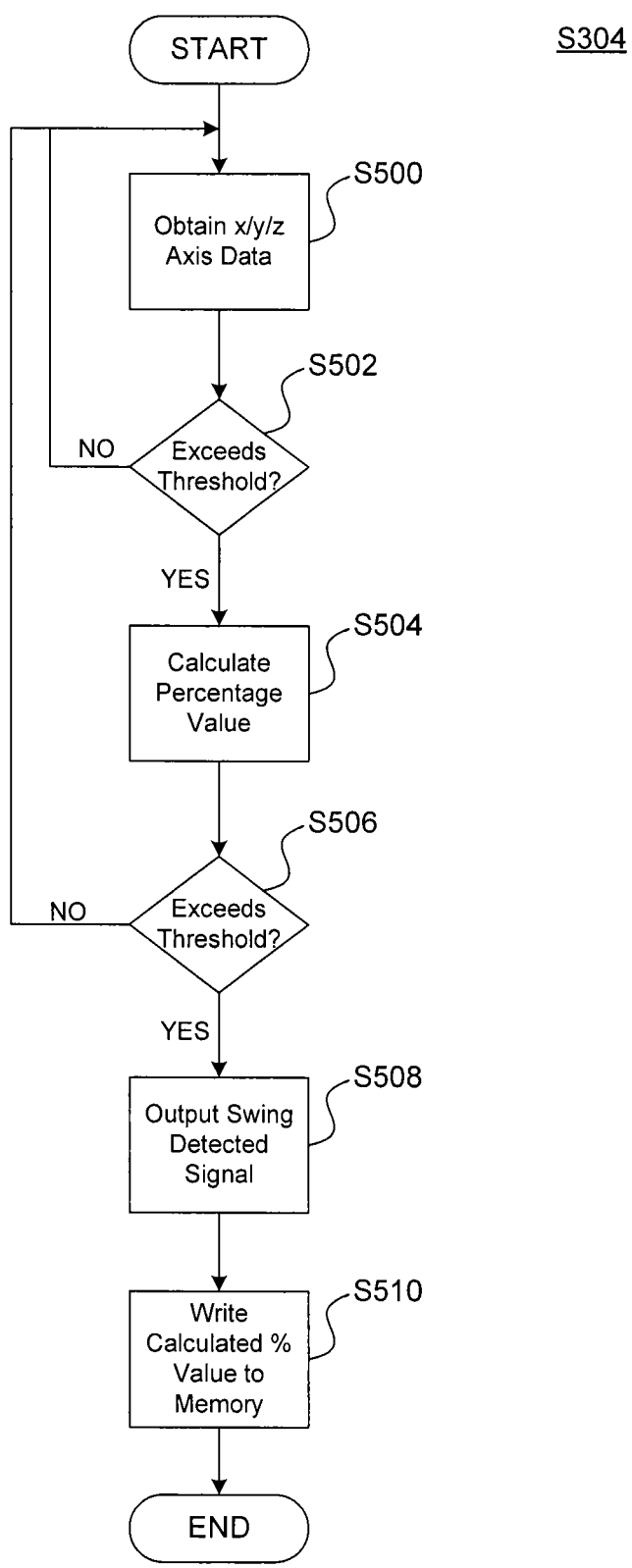
FIGS. 5A and 5B illustrate exemplary processes for determining whether a swing event has occurred.
Figure 5B:
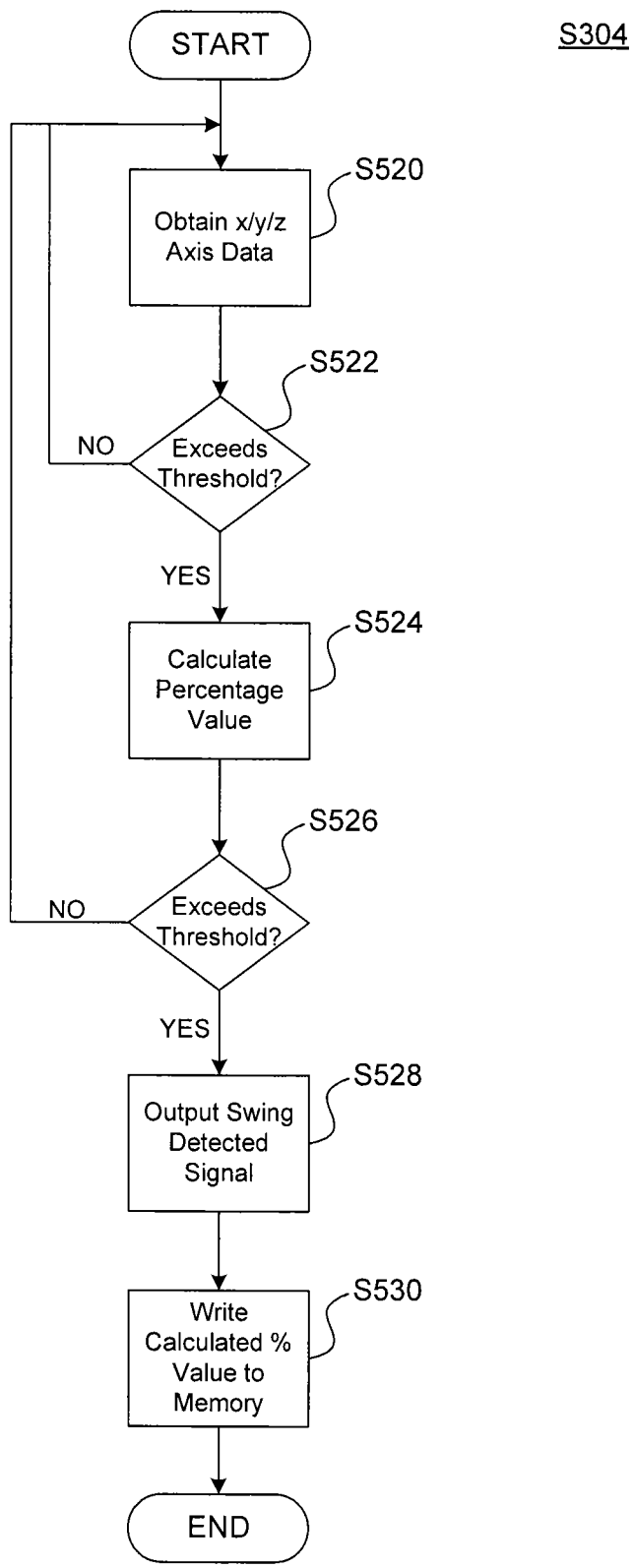

Regarding FIGS. 5A and 5B, once the tag 200 is determined to have transitioned into the active state, the controller 205 analyzes the MEM sensor data to determine whether a club swing event has occurred. Examples of sensor data used to determine whether a club swing event has occurred include the outputs of the accelerometer 220 and the gyro sensor 235. While the accelerometer 220 and the gyro sensor 235 outputs are used in the following non-limiting examples, various other sensor outputs, either individually or in combination, may be processed by the controller 205 in order to make a determination that a club swing event has occurred. Examples of these other sensor outputs may include outputs from the light sensor 240 and/or the tilt sensor 225. Further, the location aware device 100 may receive MEM sensor outputs from the tag 200 via the devices' respective RF transceivers, and the processing relating to determining whether a swing event has occurred may then be performed by the controller 105.

An exemplary process flow of acquiring and analyzing the output of accelerometer 220 at step S304 of FIG. 3 is illustrated in the flow chart shown in FIG. 5A.

Referring to FIG. 5A, the controller 205 at step S500 obtains x, y, and z-axis data output from the accelerometer 220. At step S502, the controller 205 analyzes the received x/y/z axis data and determines if the data, individually or in combination, exceeds a predetermined threshold indicating that a club swing occurred. If the output does not exceed the threshold value (e.g. the data is insufficient to indicate that a swing has been taken), the controller 205 continues to monitor the accelerometer 220 output at S500. Otherwise, when it is determined that the accelerometer data exceeds the threshold value, the controller 205 at step S504 calculates a percentage value of the accelerometer data with respect to a maximum reference output value of the accelerometer 220, and determines at step S506 whether this percentage is greater than a threshold percentage. If the percentage does not exceed the threshold percentage, the controller 205 continues to monitor the accelerometer output at S500. Otherwise, if it is determined that the calculated percentage exceeds the threshold percentage, the controller 205 outputs a signal indicating, based on the accelerometer 220 data, that a swing event occurred and writes the calculated percentage to the memory 210 (steps S508 and S510).

Figure 13:
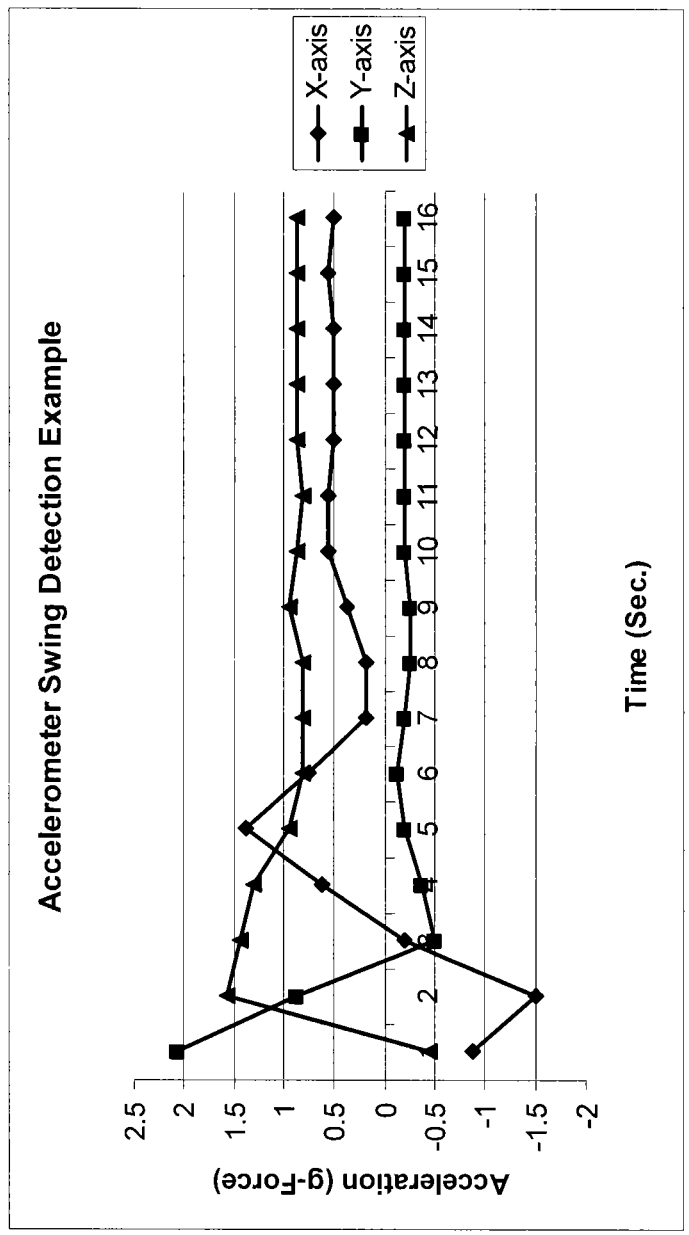
FIG. 13 illustrates an exemplary graph of accelerometer outputs.

Table 4 includes exemplary accelerometer output values for that may be used to determine when a club swing event occurs, such as in the exemplary processing of FIG. 5A. The table includes acceleration and percentage threshold values for detecting that both club motion and a club swing have occurred. The change in acceleration is computed by obtaining the minimum and maximum linear acceleration values from each of the three accelerometer axes over a short period of time following an initial g-force above a motion trigger threshold, and then computing the max-min delta for each axis (x, y, and z) and summing the absolute value of the three deltas. For example, when a threshold of 2 g is detected on any axis, the accelerometer data is captured for 8-16 seconds to analyze min/max values during that time for each axis. FIG. 13 illustrates an exemplary graph showing acceleration samples for each axis over a 16 second time period. Percentage values in Table 4 are based on a reference acceleration of 25 g. The values of Table 4 are not limiting, and the microcontroller 205 can easily be adapted to accept alternate values when performing a state determination based on an accelerometer input.

TABLE 4

Exemplary Accelerometer Output Values for Swing Event Determination

| Description | Total Delta g-Force | Percentage |
| --- | --- | --- |
| Motion Threshold | 2 g | 8% |
| Swing Threshold | 4 g | 16% |

Next, an exemplary process flow of acquiring and analyzing the output of gyro sensor 235 at step S304 of FIG. 3 is illustrated in the flow chart shown in FIG. 5B.

Referring to FIG. 5B, the controller 205 at step S520 obtains x, y, and z-axis data output from the gyro sensor 235. At step S522, the controller 205 analyzes the received x/y/z axis data and determines if the data, individually or in combination, exceeds a predetermined threshold indicating a club swing occurred. If the output does not exceed the threshold value (e.g. the data is insufficient to indicate that a swing has been taken), the controller 205 continues to monitor the gyro sensor output at S520. Otherwise, when it is determined that the gyro sensor data exceeds the threshold value, the controller 205 at step S524 calculates a percentage value of the gyro sensor data with respect to a maximum reference output value of the gyro sensor 235, and determines at step S526 whether this percentage is greater than a threshold percentage. If the percentage does not exceed the threshold percentage, the controller 205 continues to monitor the gyro sensor 235 output at S520. Otherwise, if it is determined that the calculated percentage exceeds the threshold percentage, the controller 205 outputs a signal indicating, based on the gyro sensor 235 data, that a swing event occurred and writes the calculated percentage to the memory 210 (steps S528 and S530).

Table 5 includes exemplary gyroscope output in units of total rotational g-force and percentage, which may be used to determine when a club swing event occurs, such as in the exemplary processing of FIG. 5B. Percentage values in Table 5 are based on a reference gyroscope output of 25 g total rotational delta g-force. The total rotational delta force is computed by obtaining the minimum and maximum rotational values from each of the three axes over a short period of time after an initial g-force above a motion trigger threshold, then computing the max-min delta for each axis (x, y, and z) and summing the absolute value of the three deltas. For example, when a threshold of 2 g is detected on any axis, the gyroscope data is captured for 8-16 seconds to analyze min/max values during that time for each axis. The values of Table 5 are not limiting, and the microcontroller 205 can easily be adapted to accept alternate values when performing a state determination based on a gyroscope input.

TABLE 5

Exemplary Gyroscope Output Values for Swing Event Determination

| Description | Total Rotational Delta g-Force | Percentage |
| --- | --- | --- |
| Motion Threshold | 2 g | 8% |
| Swing Threshold | 4 g | 16% |

Referring back to FIG. 3, if the controller 205 determines at S304 that the club is not being swung because the percentage data corresponding to one or both of the accelerometer 220 and the gyro 235 does not exceed one or both of their respective thresholds, the process returns to S300 and the controller 205 continues to determine whether the club is in an active state.

Otherwise, if a determination is made that the active club has been swung, a location and time are associated with the swing at step S306. The location and time information are derived by the GPS receiver 120 and the controller 105, and this information may be stored in memory 110/210 or transmitted to the remote processing unit 101. As described later, the location and time can be used to automatically calculate golf statistics, such as scoring a round of golf.

The location of the club swing is based on an association between the location of the location aware device 100 and the club swing and/or the sensor outputs on which the club swing determination is made. In a non-limiting example, upon determining that a swing event has occurred (e.g., based on a signal from the tag 200 or by the controller 105 receiving MEM sensor data and performing the swing determination processing), the location aware device 100 associates its current GPS location with the MEM sensor outputs and then stores this association in its memory 110. Thus, when used herein, the term "associated location" refers to the GPS location of the location aware device 100 associated with the relevant swing event data (e.g., the sensor outputs, an active state determination, determined swing output signal, etc.).

After a location and time are associated with the swing, a determination is made at S308 as to whether to register the swing as a ball strike (i.e., a golf shot that should be used for scoring purposes).

A non-limiting example of determining whether a swing resulted in a ball strike at S308 will now be described in greater detail with respect to FIG. 6.

Figure 6:
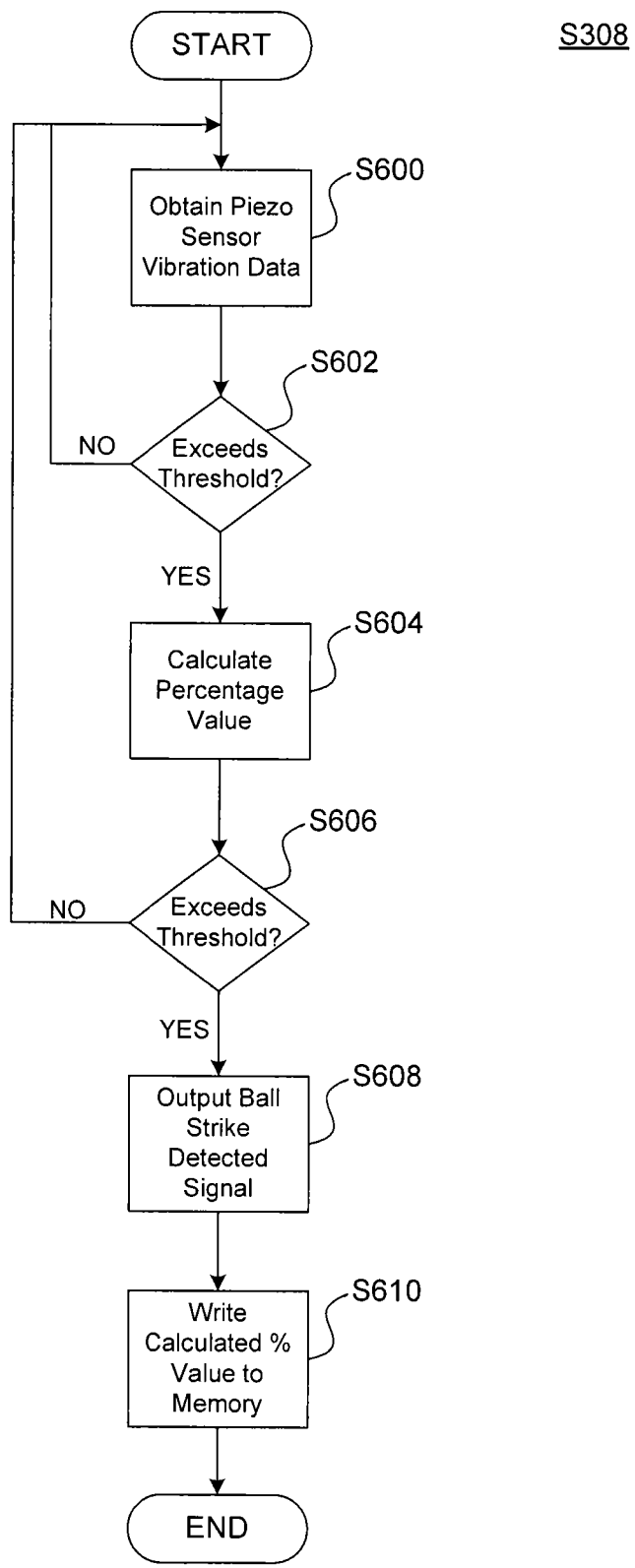
FIG. 6 is a flow chart illustrating an exemplary ball strike detection process.

Referring to FIG. 6, the controller 205 at step S600 obtains vibration and/or shock data output from the piezo sensor 230. The piezo sensor 230 data is used to detect the impact of, e.g., a golf ball, on the face of the club to which the tag 200 is attached. At step S602, the controller 205 analyzes the data output from the piezo sensor 230 and determines if the data exceeds a predetermined threshold that would indicate a ball strike. If the piezo sensor 230 output does not exceed the threshold value (e.g. the data is insufficient to indicate that the club has impacted a ball), the controller 205 continues to monitor the piezo sensor 230 output at S600. Otherwise, if it is determined that the obtained vibration and/or shock data from the piezo sensor 230 exceeds the threshold value, the controller 205 at step S604 calculates a percentage value of the piezo data with respect to a maximum reference output value of the piezo sensor 230. At step S606, the controller 205 determines whether the calculated percentage is greater than a predetermined threshold percentage. If the calculated percentage does not exceed the threshold percentage, the controller 205 continues to monitor the piezo sensor output at S600. Otherwise, if it is determined that the calculated percentage exceeds the threshold percentage, the controller 205 outputs a signal indicating the detection of a ball strike and writes the calculated percentage to the memory 210 (steps S608 and S610).

Figure 14:
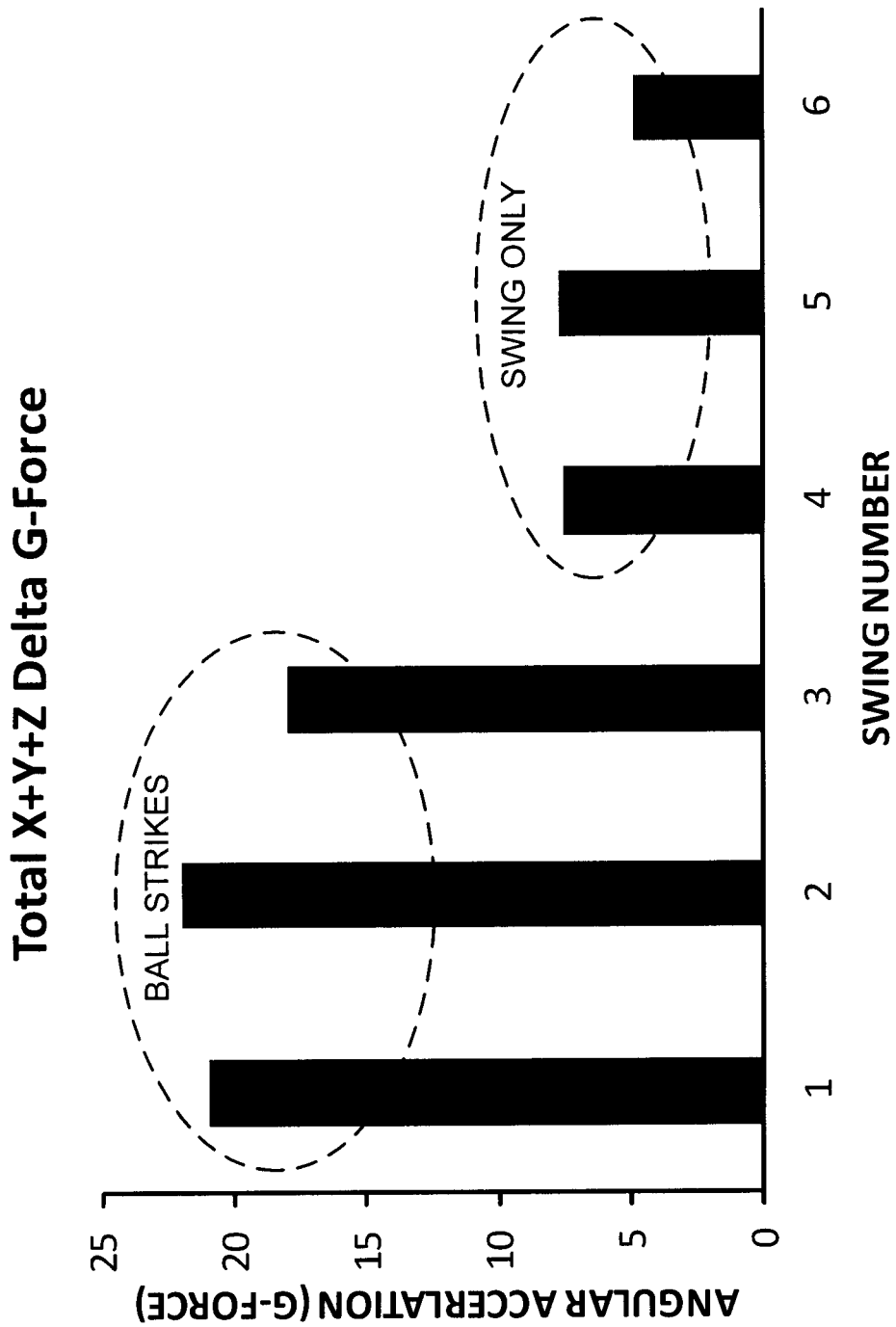
FIG. 14 illustrates an exemplary graph of accelerometer outputs for detecting ball strikes.

As an additional non-limiting example, outputs from the accelerometer 220 may also be utilized to distinguish between ball strikes and swings that do not result in impact with the ball. For illustration purposes, FIG. 14 shows an exemplary graph illustrating differences in measured angular acceleration for ball strikes and swings that do not result in a ball strike. As is evident in the figure, ball strikes typically result in significantly higher measured g-force across all axes (i.e., x-y-z) when ball strikes occur when compared to swings without ball strikes. Thus, the present disclosure may easily be adapted for utilizing acceleration measurements for detecting ball strikes.

Thus, building on the processing described above with respect to FIG. 3, the controller 205 first determines if the club is in an active or rest state by monitoring data indicating light data and/or a tilt of the club. The process then analyzes the accelerometer 220 and/or gyro sensor 235 data to determine if the club is actually being swung. If the club is active and has been swung, the controller 205 then analyzes to the output of the piezo sensor 230 and/or the accelerometer 220 to determine if the active and swinging club has made contact with an object. If so, it is likely that the club to which the tag 200 is attached has been used to strike a ball.

Turning back to FIG. 3, if no determination is made to register the swing as a ball strike at S308, the club swing monitoring process returns to step S300. Otherwise, if the determination is made to register the swing as a ball strike, a "shot" (i.e., a golf stroke that should be included in scoring) is registered at S310 as having taken place at the associated location and time from step S306. Additionally, the controller 205 can associate the shot with the club used in the swing, based on, e.g., club ID information of the tag 200. The GUI of the location aware device 100 may also display information identifying the location of the swing and the club used in the swing on the display 125.

Thus, following the above-described processing related to FIG. 3, data associated with one or more detected golf shots is stored, and the stored data can then be used to perform further calculations relating to golf statistics. For instance, each detected golf shot over a predetermined time period (e.g., a time period during which a golfer is on a particular hole) can be compiled and automatic scoring can be performed. Further, distance information can be calculated for each shot hit with a particular club, which can be used for historical tracking, club comparisons, etc.

While the above processing provides an effective method for performing club state, club swing, and deemed ball strike determinations, further improvements in automatic golf statistic calculations may result from incorporating additional data points. For example, the deemed ball strike determination of FIG. 6 may result in false positives when the piezo sensor 230 detects a club striking the ground rather than the golf ball. Additionally, while a golf shot history may be determined and stored in the processing of FIG. 3, it may prove difficult to discern which shots were taken on a particular hole using only MEM sensor data, thereby increasing the difficulty of automatic hole-by-hole scoring. Moreover, automatic scoring can be further complicated by inadvertently classifying "practice" swings as actual golf strokes. That is, after a club's tag transitions to the active state, multiple practice swings may be taken prior to actually striking the ball with a swing and returning the club tag to an inactive state (i.e., placing the club in the golf bag). However, of the swings taken while the tag was in an active state, only the swing resulting in a ball strike should ideally be counted for automatic scoring, although in practice it is not essential that the swing resulting in a ball strike be the swing counted for scoring as long as only one swing at a given location is counted.

Figure 7:
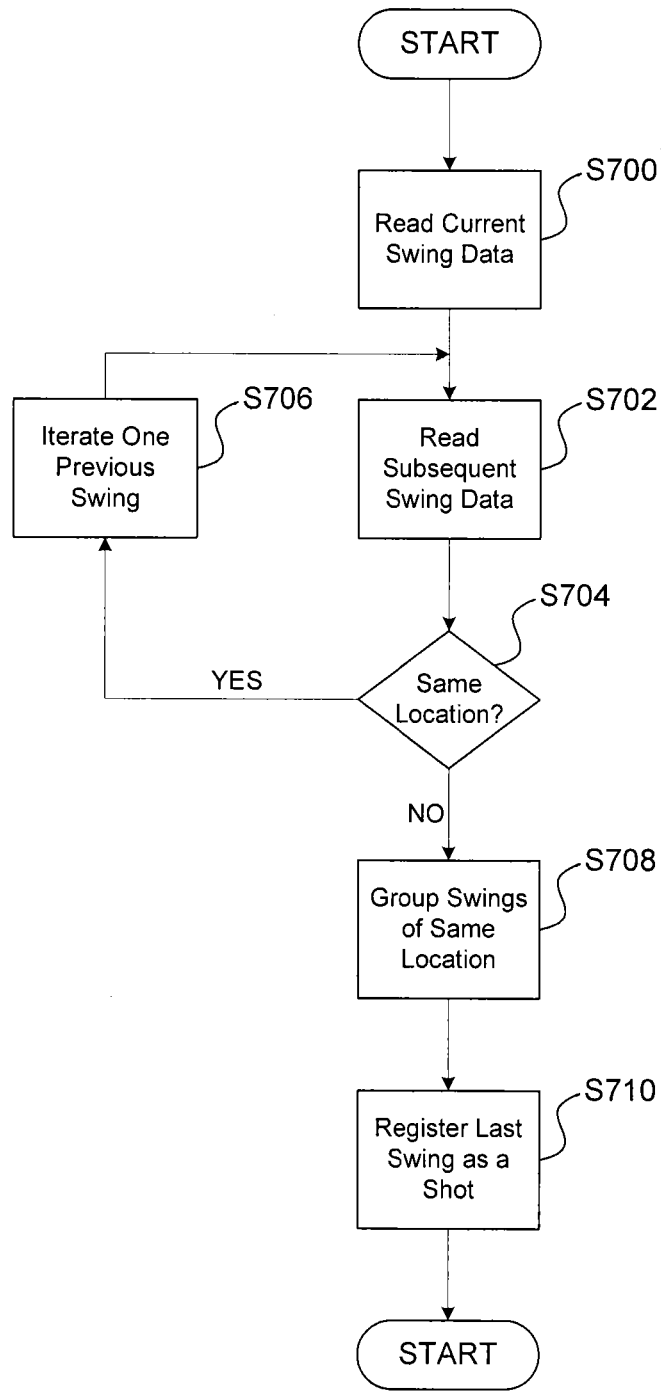
FIG. 7 is an exemplary flow chart illustrating an exemplary process for determining whether to register a swing as a shot based on geo-spatial location and/or time.
Figure 8:
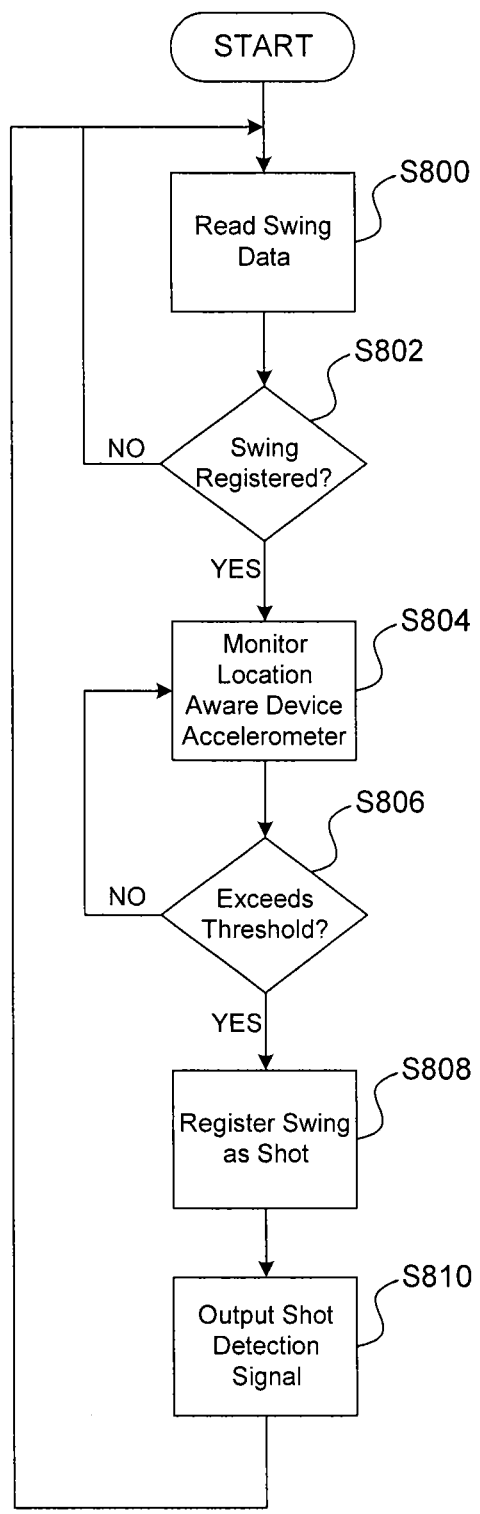
FIG. 8 is an exemplary flow chart illustrating an exemplary process for determining whether to register a swing as a shot based on location aware device movement.

In a non-limiting example, shot quantity, time, location, and distance information may be used as additional parameters when determining whether a golf shot (i.e., and ball strike that should be included in scoring) has occurred. FIGS. 7 and 8 are exemplary flow charts respectively outlining processes of determining whether to register a swing as a shot using a number of shots at a geo-spatial location, time, and/or location aware device movement. The exemplary processes of FIGS. 7 and 8 may be used individually or in combination; however, the processes are preferably used in conjunction with the processes of FIGS. 3-6 for improved shot determination accuracy.

Referring to FIG. 7, the location aware device 100 at step S700 reads the swing data for the current swing from the memory 110. At step S702, the location aware device 100 reads the immediately preceding swing data from the memory 110, and determines at step S704 whether the current swing occurred at the same location as the previous swing within a predetermined margin of error. The margin of error for the determination of whether a current swing occurs at the same location as a previous swing should allow for some deviation to account for the golfer taking practice swings and the like, but should not so great as to discount actual shots that do not travel very far. Therefore, when the current swing is compared to previously stored swings, the previous swings do not have to occur at precisely the same location as the current swing, but rather substantially near the current shot or swing within the margin of error. Preferably, the margin of error should not be greater than a 25 yard radius.

The margin of error might also be based on the club selected for the immediately preceding shot. In other words, knowing that a preceding shot had a higher likelihood of traveling a relatively longer distance can be factored into the margin of error calculation. Alternatively, the currently selected club may be used as a basis for determining the distance margin of error. For instance, if the user's average shot distance with his 5-iron is 170 yards, and his average shot distance for his 9-iron is 120 yards, the margin of error might be 25% of 170 yards (i.e., 42 yards) for swings with the golfer's 5-iron, and 25% of 120 yards (i.e., 30 yards) for swings with his 9-iron. In this case, a percentage or other component of a standard distance for each club could be stored in advance, or the average distance the user hits each club could be calculated by the controller 105 and stored in the memory 110.

Referring again to FIG. 7, if at S704 the controller 105 determines the current swing occurred at the location of the immediately preceding swing, the controller 105 iterates back one unit in the memory 110 (S706) and then reads the swing data from that memory location (S702). That is, the controller 105 retrieves the swing data from two swings ago. This iteration process continues as long as each subsequently preceding swing occurred at the same location as the current swing.

At step S708, the controller 105 groups the swings occurring at the same location. A group of swings occurring at the same location could be indicative of, e.g., a series of practice swings following by at least one ball strike. Thus, because of the high likelihood of a golf shot occurring under these circumstances, the controller 105 at step S710 registers the final swing at the current location as a golf shot, and associates the club data from the tag 200 with the registered shot. Consequently, the exemplary process of FIG. 7 provides an additional indication that a golf shot should be registered for later processing (e.g., automatic scoring) without the need for costly filters and additional sensors.

While the final swing in a series of swings is given priority in the exemplary shot determination processing of FIG. 7, the priority given to swings may be based on any order of swings or shots. For example, to the first swing at a location, or any other swing in a series of swings can be registered as a shot for that location. In an embodiment with a piezo sensor, priority could also be given to the swing in which the piezo sensor data, as described above with respect to FIGS. 3 and 6, indicates that a ball strike has occurred.

The number of previous swings compared in FIG. 7 might also be limited by including a time component. For example, considering only shots that have been previously registered within a predetermined period of time from the current swing, such as 5 minutes or 1 hour. In addition to aiding in differentiating between practice swings and actual ball strikes, including a time limitation also makes it less likely that swings in a round of golf would be compared, for instance, to shots registered in a prior round of golf or, that swings which result in shots being played from the a similar location but while playing different holes would be compared. The latter scenario may occur, e.g., when playing two sequential, parallel holes running in opposite directions in which the golfer hits his ball into the same rough area adjoining the two holes.

Moreover, the controller 105 may group detected swings that occurred within a short period and that were followed by a relatively long time lapse prior to the next swing detection. This may be indicative of a group of practice swings and/or shots occurring a one location, followed by a walk to the next ball location where a second series of swings/shots occurred. In this case, the controller 105 may register one of the swings occurring in the group closely timed swings as a potential shot, similarly to the process of FIG. 7.

Additionally, the shot determination of FIG. 7 might also include a directional component, such as, discounting swings which are taken at a location which is inapposite to the direction in which the current golf hole is normally played. For example, a swing taken at 13:07 hours 20 yards south of a swing taken at 13:06 hours on a hole normally played south to north, might be discounted as a practice swing and not an actual swing. Further, sensor inputs could provide further indications that a swing was taken while the golfer was facing the incorrect direction, and therefore should not be registered as a shot.

Next, a movement of the location aware device 100 (i.e., a physical movement or rotation along a vector) may provide an indication that a swing resulting in a ball strike has occurred. For example, a rotational movement of the location aware device 100, as detected by the accelerometer 150, may indicate a swing and/or ball strike occurred in the case that a golfer was carrying the location aware device 100 during the swing. Preferably, movement data from the location aware device 100 is analyzed in conjunction with another shot determination indication (e.g., any of the shot determination processes described above with respect to FIGS. 3-7).

FIG. 8 depicts a non-limiting example in which the determination of whether to register a swing as a shot based the movement of the location aware device 100, where the movement is based on a detection by the location aware device's accelerometer 150.

Referring to FIG. 8, the location aware device 100 at step S800 monitors the swing data in the memory 110 and/or 210, and determines at step S802 whether a swing event has been registered. If no swing event has been registered, the location aware device 100 continues to monitor the swing data. Otherwise, if a swing event has been registered, the location aware device 100 at step S804 monitors whether there is a movement of the location aware device 100, based on a detection of movement by the location aware device's accelerometer 150. At step S806, the location aware device 100 determines whether the detected accelerometer 150 output exceeds a predetermined threshold. If the outputs of the accelerometer 150 do not exceed the stored threshold values, the location aware device 100 continues to monitor the device's accelerometer 150 output. If the output of the accelerometer 150 exceeds the stored threshold value, the location aware device 100 at step S808 registers the swing data as a shot at the location and time associated with swing, and outputs a shot detection signal at step S810. The location aware device 100 then returns to monitoring the swing data.

The efficaciousness of shot determination processing can be further improved if the determination as to whether to register a swing as a shot includes both a location based determination as described in connection with FIG. 7, and a movement based determination as described in connection with FIG. 8. Such a combination should also be considered as within the scope of the present disclosure. As one skilled in the art can appreciate, when using the combined processes of FIGS. 7 and 8 it is possible that there will be more than one swing event registered as having occurred since the last swing event was saved as a shot and/or before there has been a detected movement of the location aware device 100. For such cases, the location aware device 100 can be configured to determine, at or before step S808, which of the several registered swing events to register as a shot. Preferably, the last swing event before a detected GPS position movement of the location aware device 100 would be registered as a shot. However, any swing in a series of swings without an intervening detected GPS position movement of the location aware device 100 could be selected as the swing to register as a shot. For example, if a detected GPS position movement occurs; then the golfer takes Swing 1, Swing 2, Swing 3, and Swing 4; then another detected movement occurs; either of Swing 1, Swing 2, Swing 3, or Swing 4 could be selected as the swing to register as a shot. Conversely, if a detected GPS position movement occurs, then the golfer takes Swing 1 and Swing 2, then another detected GPS movement occurs, then golfer takes Swing 3 and Swing 4, then another detected GPS movement occurs, Swing 1 and Swing 2 would not be included in a determination that includes whether Swing 3 or Swing 4 should be registered as a shot.

Because a golfer may not take the location aware device to the green when it comes time to chip or putt, successive shots at or very near the green may need to be manually entered. To this end, the location aware device 100 may be configured to accept an input from the user to designate a swing as a shot. Additionally, the location aware device 100 may be configured to accept an input to "mark" a ball location. For example, a user may input a "mark" request to the location aware device 100, and the controller 105 designates the current GPS receiver 120 location as the ball location. These inputs indicating a shot and/or marked ball location can be used individually or in combination with any of the foregoing processes to perform a shot determination analysis.

Tables 6-8 include exemplary thresholds for velocity, time, and distance, which may be used to determine when a swing is registered by the location aware device 100. In the example of Table 6, a stopped status is set and a swing is registered when location aware device velocity is below 1 km/hr, and a moving status is set when the velocity exceeds 1 km/hr. In the example of Table 7, a stopped status is set and a swing is registered when measured location aware device velocity is below 1 km/hr for 3 seconds, and a moving status is set when the velocity exceeds 1.5 km/hr for 4 seconds. In the example of Table 8, if location aware device velocity is below 1 km/hr for 3 seconds, then a stopped status is set, a swing is registered, and the current latitude and longitude of the location aware device 100 is saved; and if location aware device velocity goes above 1.5 km/hr for 4 seconds and the current latitude and longitude differs from the saved latitude and longitude by over 7 yards, then a moving status is set.

TABLE 6

Simple Velocity Thresholds

| Description | Velocity | Register? |
|---|---|---|
| Device Stopped | <1 km/hr | Yes |
| Device Moving | ≥1 km/hr | No |

TABLE 7

Velocity with Time Thresholds

| Description | Velocity | Time | Register? |
|---|---|---|---|
| Device Stopped | <1 km/hr | >3 sec | Yes |
| Device Moving | >1.5 km/hr | >4 sec | No |

TABLE 8

Multi-threshold Including Time

| Description | Velocity | Time | Distance | Register? |
|---|---|---|---|---|
| Device Stopped | <1 km/hr | >3 sec | — | Yes |
| Device Moving | >1.5 km/hr | >4 sec | >7 yards | No |

Next, it should also be noted that the tag system used in conjunction with a location aware device is the preferred implementation of the present disclosure because of the benefits of associating location information with the data. However a device that has no "location awareness" (i.e. no GPS, inertial systems or other location functions) can still utilize certain features of this system, such as the club reminder function of notifying a golfer if he has not returned a club to the golf bag, tag polling functions for club bag inventory, and automated scoring and statistics functions. Additionally, a user would still have the ability to approximate a shot location and distance on a graphic GUI or via a data analysis function.

Figure 10:
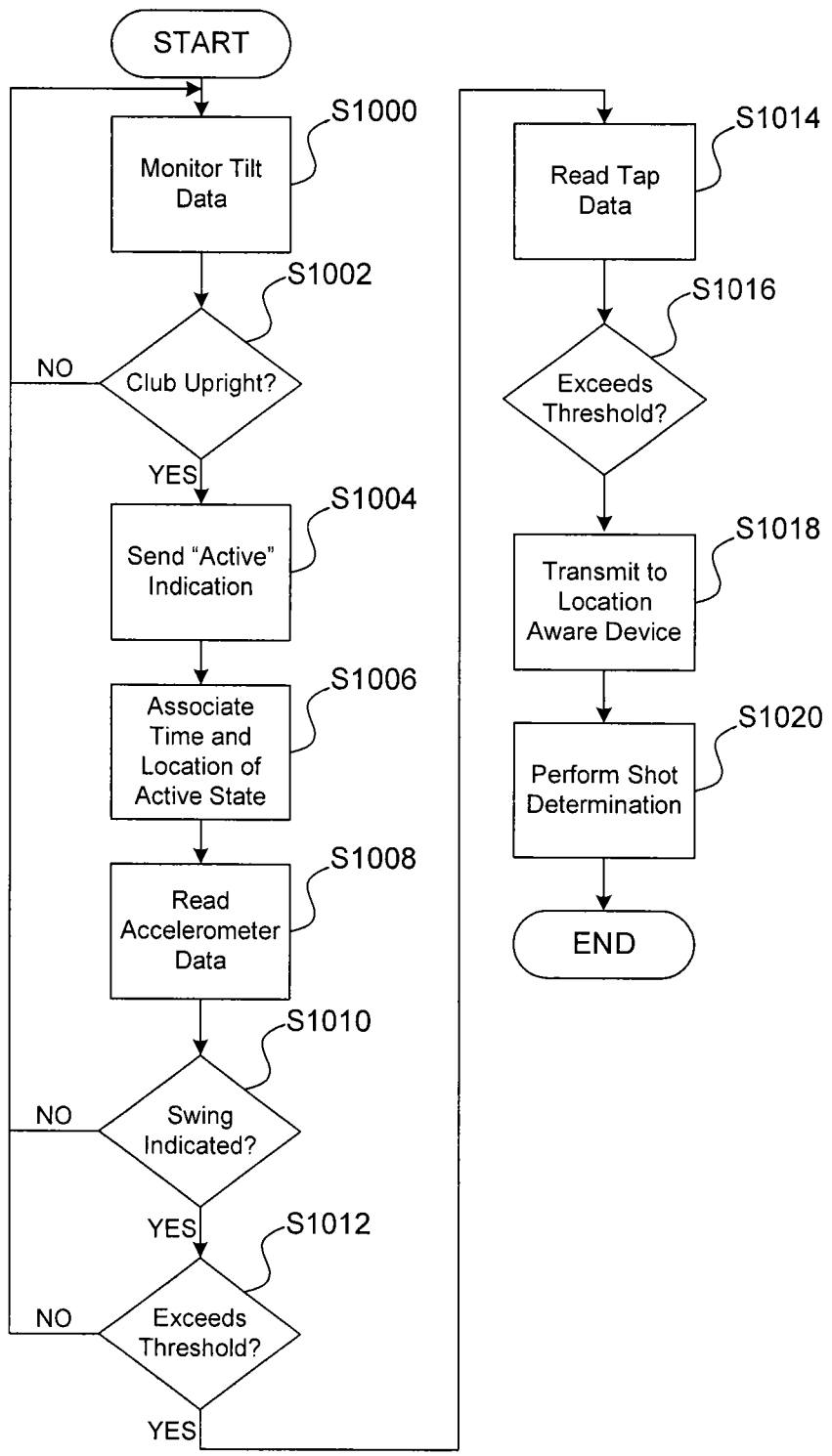
FIG. 10 illustrates an exemplary process of detecting a ball strike using only accelerometer inputs.

As a non-limiting example of performing aspects of the present disclosure without "location aware" elements (e.g., GPS), FIG. 10 illustrates an exemplary process of detecting a ball strike using only the accelerometer 150 of the location aware device 100, and the accelerometer 220 of the tag 200.

Referring to FIG. 10, the process starts at step S1000 where the controller 205 of the tag 200 monitors a status of the tilt data provided by the accelerometer 220 to determine if the club has been removed from the user's bag. This determination may be performed by, e.g., determining if the club has been turned upright (i.e., with the club head toward the ground). If the club is not upright, the tag continues monitoring the tilt data to determine if the club has been removed from the bag and therefore, should be placed in an active state. Otherwise, if the club is determined to be upright at S1002, the associated tag 200 is placed in an active state.

At step S1004, if the club is upright and the tag 200 is in an active state, the controller 205 of the tag 200 controls the transceiver 215 to send an indication to the location aware device 100 that the club is in an active state. This transmitted information indicates both that the club is now in an active state, and also may include a unique ID corresponding to the tag 200. As discussed above, this unique ID may specifically identify the club associated with the tag 200, or it may be some other type of ID that is specific to the tag 200 and has previously been correlated by the location aware device 100 with an identification of the club to which it is attached.

At step S1006, the location aware device 100 may then associate a location and time to the club active determination data and display an indication to a user that a specific club has been selected for a shot.

Once the tag is determined to have transitioned into the active state, the controller 205 at step S1008 reads accelerometer data directly or from memory to determine if the club is being swung. If the club is not being swung based on the accelerometer data, the tag continues to monitor the status of the tilt data. Otherwise, if the accelerometer data indicates the club is being swung at step S1012, the controller 205 determines at step S1014 if the accelerometer 205 output exceeds a predetermined threshold value.

If the accelerometer data is determined not to exceed the threshold value, the tag continues to monitor the status of the tilt data. Otherwise, if the output of the accelerometer exceeds the threshold value, the controller 205 reads the accelerometer data directly or stored in memory at step S1016 and determines at step S1018 if the accelerometer data exceeds another predetermined threshold.

If the accelerometer data is determined not to exceed the threshold value, the tag continues to monitor the status of the tilt data. Otherwise, if the accelerometer data exceeds the predetermined threshold, the controller 205 at step S1020 provides the accelerometer 205 data to the RF transceiver 215, which transmits the data along with tag ID information to the location aware device 100. The location aware device 100 then processes the accelerometer data, as discussed above with reference to FIG. 8, to determine if a shot should be registered.

Next, as mentioned previously, any swing or shot determination processing described herein may be used individually or in combination, thereby improving the accuracy of shot detection and related golf statistics calculations. For example, the output of a shot detection using piezo sensor 230 as in FIGS. 3 and 6 could be combined with the output using the process of FIG. 7 such that a probability of a shot occurring is calculated. This probability may, e.g., be compared to a predetermined probability threshold, where a shot would be registered if the calculated probability exceeds the threshold. The probability may also be a weighted probability that mathematically weights based on, e.g., the reliability with which a respective input indicates a particular outcome. For example, when determining whether a shot occurred, the controller may provide greater weight to detected changes in GPS location than detected movement of the location aware device 100 via accelerometer 150. Further, the mere presence of multiple inputs indicating a shot occurred may increase the probability value. For example, the device may determine that if two or more inputs indicating a shot occurred are received (e.g., a swing detection plus a change in GPS location, a swing detection plus detected swing motion of the location aware device, a swing detection plus no change in GPS location for a predetermined time period, manually marking a ball plus a change in GPS location, etc.), then a shot is registered and can be used for automatic statistics calculations (e.g., scoring). Additionally, conditional probabilities may be calculated or assigned based on receipt of multiple shot detection indications.

Further, as previously mentioned, any one of the location aware device 100, the tag 200, and the remote processing unit 101 may perform any processing of the present disclosure by transmitting and receiving sensor data and other indications across the devices' respecting transmission paths. Additionally, the devices may be configured to perform their functions by actively requesting data inputs, or by passively receiving data inputs and performing the applicable processing in response to the passive detection. As a non-limiting example, the location aware device 100 may be configured to "poll" the tags to determine a status of the tags or perform any processing described herein (e.g., swing detection, shot detection, lost club). This polling process may, e.g., be used to determine the status of the tag's battery, or may be used to determine whether a tag is not within a communication distance of the location aware device 100. If the tag is not reachable, it may provide an alternative way of determining that the club was left behind on the course.

Figure 11:
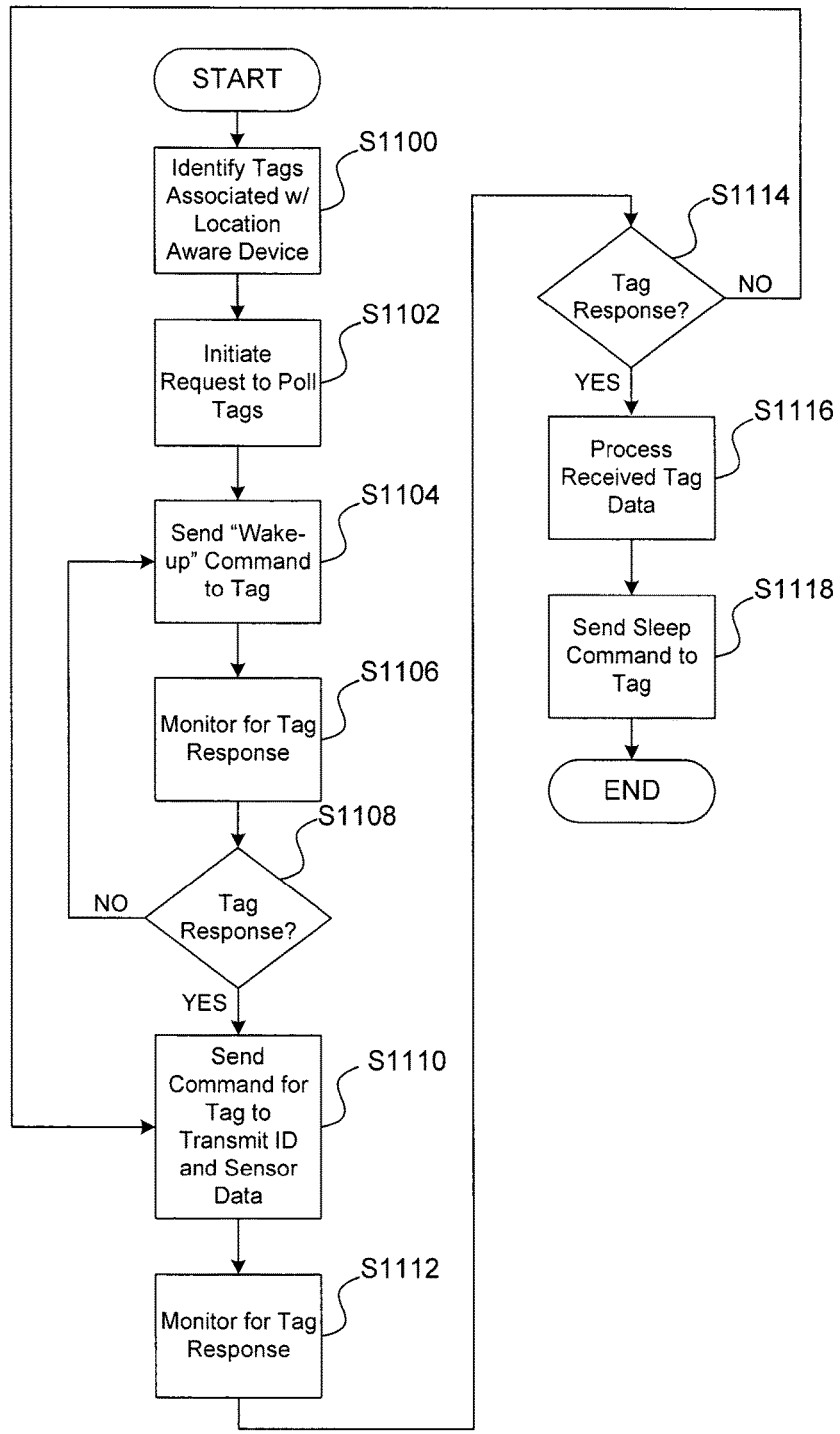
FIG. 11 illustrates an exemplary process of actively retrieving information from a tag.

FIG. 11 illustrates an exemplary process of actively retrieving (e.g., "polling") information from the tags by the location aware device 100. Initially at step S1100, the location aware device 100 identifies the tags associated with the location aware device 100 and initiates a request at step S1102 to poll information from the associated tags. The process of polling information from the tags may be initiated at a predetermined period of time during the operation of the location aware device 100, or may be triggered by the failure of the tag to indicate that the club has been rendered inactive (i.e., returned to the user's bag) within a predetermined time period. This process of determining that the location aware device 100 is no longer able to communicate with the tags is yet another configuration by which the location aware device 100 may indicate that a club has been left behind by a user.

Once the location aware device 100 determines to initiate a polling request to the tags, the controller 105 sends a "wake-up" signal to the RF transceiver 215 at step S1104, which transmits the signal to each of a plurality of tags. The controller 105 at step S1106 then monitors to determine if the tags have transmitted a response to the wake up message. If one or a plurality of the tags has not responded, the location aware device then transmits another wake-up command to the tags. As discussed above, if one or more of the plurality of tags have not responded, the location aware device may display a message to the user via the GUI of the location aware device 100. The displayed message may indicate that the tag is unresponsive, thus informing the user that either the battery of the tag is dead, or that the club has been lost or left behind.

Upon receiving a response from the tag at step S1108, the location aware device 100 initiates a command at step S1110 for the tag to transmit its ID and current sensor data and transmits the command to the tags requesting that each tag transmits its ID and current sensor data. The location aware device 100 monitors this subsequent request for information at step S1112 to determine if the tag is unresponsive after the initial request. If the tag has not yet responded at step S1114, the location aware device again initiates and transmits the request for the tags to transmit their ID and current sensor data. After receiving a response at step S1114, the controller 105 at step S1116 processes the data received from the tag and then initiates a command for the tag to enter (or re-enter) an inactive state, and transmits this command to the tag at step S1118. Alternatively, the tag can automatically go back into an inactive state, e.g., after a predetermined time period elapses after receiving the wake-up command.

Next, a hardware description of the remote procession unit 101 is described with reference to FIG. 12. While the remote processing unit 101 is taken as exemplary with respect to FIG. 12, it should be appreciated that location aware device 100 may also be embodied in accordance with the following hardware description.

Figure 12:
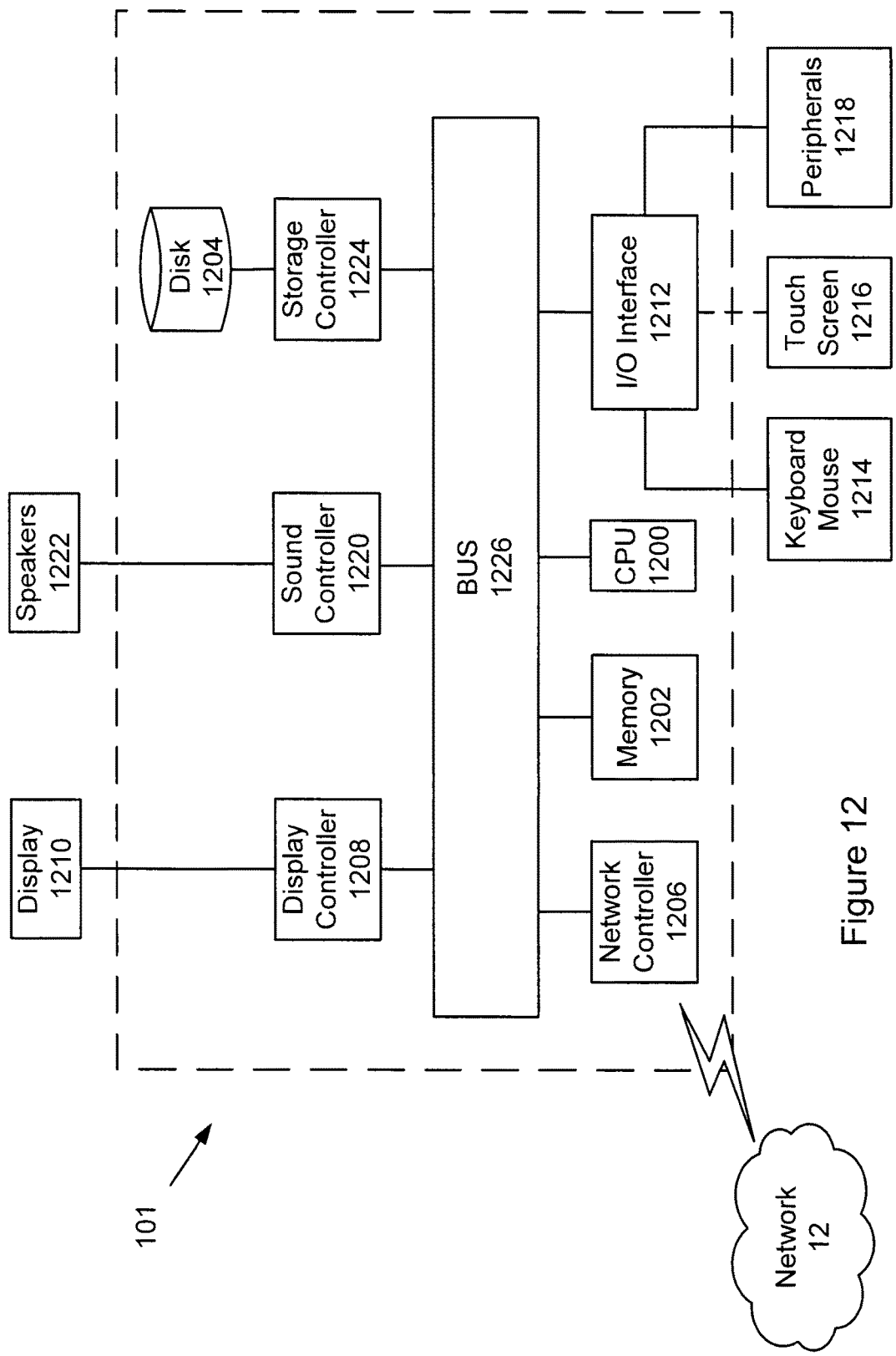
FIG. 12 illustrates an exemplary hardware configuration of a remote processing unit.

In FIG. 12, the remote processing unit 101 includes a CPU 1200 which performs the processes described above. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the remote processing unit 101 communicates, such as a server or computer.

Further, the claimed advancements may be provided as a utility application, background daemon, or component of an operating system, or combination thereof, executing in conjunction with CPU 1200 and an operating system such as Microsoft Windows 7, UNIX, Solaris, LINUX, Apple MAC-OS and other systems known to those skilled in the art.

CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The remote processing unit 101 in FIG. 12 also includes a network controller 1206, such as an Intel Ethernet PRO network interface card from Intel Corporation of America, for interfacing with network 12. As can be appreciated, the network 12 can be a public network, such as the Internet, or a private network such as an LAN or WAN network, or any combination thereof and can also include PSTN or ISDN sub-networks. The network 12 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The remote processing unit 101 further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display

1210. General purpose I/O interface also connects to a variety of peripherals 1218 including printers and scanners, such as an OfficeJet or DeskJet from Hewlett Packard.

A sound controller 1220 is also provided in the remote processing unit 101, such as Sound Blaster X-Fi Titanium from Creative, to interface with speakers/microphone 1222 thereby providing sounds and/or music. The speakers/microphone 1222 can also be used to accept dictated words as commands for controlling the remote processing unit 101 or for providing location and/or property information with respect to the target property.

The general purpose storage controller 1224 connects the storage medium disk 1204 with communication bus 1226, which may be an ISA, EISA, VESA, PCI, or similar, for interconnecting all of the components of the remote processing unit 101. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

A number of implementations have been described. Nevertheless, it will be understood that various modifications may be made without departing from the spirit and scope of this disclosure. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

The invention claimed is:

1. A location-aware device comprising:
    a position determination sensor that determines a position of the location-aware device;
    a receiver that receives, from a tag coupled to a golf club, data corresponding to an output of a sensor included in the tag;
    a processor that associates the data received from the tag with the determined position, and processes the data received from the tag to determine whether to register a golf shot as having occurred at the determined position; and
    a memory configured to store a golf shot determined to be registered by the processor along with the determined position,
    wherein, during processing of the data received from the tag to determine whether to register a golf shot, the processor is configured to compare the data received from the tag to previously stored other data received from the tag to determine whether a current swing occurred at a same location as a previous swing within a predetermined margin of error distance,
    wherein in the processing of the data received from the tag to determine whether to register a golf shot when the current swing has occurred at the same location as the previous swing, the processor is configured to select the data relating to the current swing as a last data stored in association with the determined position as the registered golf shot at the determined position,
    wherein the processor is configured to automatically select the last data as the registered golf shot in response to a subsequent swing detection at a different location when a distance from the determined position to the different location is greater than the predetermined margin of error distance,
    wherein the margin of error distance is determined in part on the golf club used to hit the golf shot at the determined position.

2. The location-aware device of claim 1, wherein the receiver is a transceiver.

3. The location-aware device of claim 1, wherein the data received from the tag includes information indicating that the data corresponds to a golf shot.

4. The location-aware device of claim 1, wherein processing the data to determine whether to register a golf shot includes comparing the data corresponding to the output of the sensor to a predetermined threshold value, and registering a golf shot as having occurred at the determined position when the data corresponding to the output of the sensor exceeds the predetermined threshold value.

5. The location-aware device of claim 1, wherein the data received from the tag corresponds to an output of an accelerometer included in the tag, and
    processing the data to determine whether to register a golf shot includes comparing the data corresponding the output of the accelerometer to a predetermined threshold value, and registering a golf shot as having occurred at the determined position when the data corresponding the output of the accelerometer exceeds the predetermined threshold value.

6. The location-aware device of claim 1, wherein the data received from the tag corresponds to an output of a light sensor included in the tag, and
    processing the data to determine whether to register a golf shot includes comparing the data corresponding the output of the light sensor to a predetermined threshold value, and registering a golf shot as having occurred at the determined position when the data corresponding the output of the light sensor exceeds the predetermined threshold value.

7. The location-aware device of claim 1, wherein the data received from the tag corresponds to an output of a position sensor included in the tag, and
    processing the data to determine whether to register a golf shot includes comparing a change in position indicated by the data corresponding the output of the position sensor to a predetermined threshold value, and registering a golf shot as having occurred at the determined position when the data corresponding the change in position indicated by the data corresponding the output of the position sensor exceeds the predetermined threshold value.

8. The location-aware device of claim 1, wherein
the data received from the tag corresponds to an output of a tilt sensor included in the tag, and
processing the data to determine whether to register a golf shot includes comparing a change in tilt indicated by the data corresponding the output of the tilt sensor to a predetermined threshold value, and registering a golf shot as having occurred at the determined position when the data corresponding the change in tilt indicated by the data corresponding the output of the tilt sensor exceeds the predetermined threshold value.

9. The location-aware device of claim 1, wherein
the data received from the tag corresponds to an output of a gyro sensor included in the tag, and
processing the data to determine whether to register a golf shot includes comparing a change in orientation indicated by the data corresponding the output of the gyro sensor to a predetermined threshold value, and registering a golf shot as having occurred at the determined position when the data corresponding the change in orientation indicated by the data corresponding the output of the gyro sensor exceeds the predetermined threshold value.

10. The location-aware device of claim 1, wherein
the memory stores the data received from the tag that is associated with the determined position by the processor each time data is received from the tag.

11. The location-aware device of claim 1, wherein
processing the data received from the tag to determine whether to register a golf shot includes detecting that the location-aware device has moved greater than a predetermined distance from the determined position, and registering a golf shot as having occurred at the determined position based on the detecting.

12. The location-aware device of claim 11, wherein
the predetermined distance is 25 yards.

13. The location-aware device of claim 1, wherein
the receiver receives, from the tag, an indication that the tag is in an active state.

14. The location-aware device of claim 1, wherein
the processor computes a golf shot probability value based on the data corresponding to the output of the sensor.

15. The location-aware device of claim 14, wherein
processing the data received from the tag to determine whether to register a golf shot includes comparing the computed golf shot probability value to a predetermined threshold value.

16. The location-aware device of claim 14, wherein
the processor computes the golf shot probability value by weighting data corresponding to outputs of a plurality of sensors included in the tag.

17. The location-aware device of claim 1, further comprising:
a display that displays an indication that a golf shot has occurred at the determined position.

18. A method comprising:
determining, by a position determining sensor, a geospatial position;
receiving, from a tag coupled to a golf club, data corresponding to an output of a sensor included in the tag;
associating, by a processor, the data received from the tag with the determined position;
determining, by the processor based on the data received from the tag, whether to register a golf shot as having occurred at the determined position; and
storing, in a memory, a golf shot determined to be registered by the processor along with the determined position,
wherein determining whether to register a golf shot includes comparing the data received from the tag to previously stored other data received from the tag to determine whether a current swing occurred at a same location as a previous swing within a predetermined margin of error distance,
wherein in determining whether to register a golf shot when the current swing has occurred at the same location as the previous swing, the processor is configured to select the data relating to the current swing as a last data stored in association with the determined position as the registered golf shot at the determined position,
wherein the processor is configured to automatically select the last data as the registered golf shot in response to a subsequent swing detection at a different location when a distance from the determined position to the different location is greater than the predetermined margin of error distance,
wherein the margin of error distance is determined in part on the golf club used to hit the golf shot at the determined position.

19. A non-transitory computer readable medium having instructions stored therein that when executed by one or more processors causes the one or more processors to perform a method comprising:
determining a geospatial position;
receiving sensor data corresponding to an output of a sensor included in a tag coupled to a golf club;
associating, by the one or more processors, the sensor data with the determined position;
determining, by the one or more processors based on the received sensor data, whether to register a golf shot as having occurred at the determined position; and
storing, in a memory, a golf shot determined to be registered along with the determined position,
wherein determining whether to register a golf shot includes comparing the data received from the tag to previously stored other data received from the tag to determine whether a current swing occurred at a same location as a previous swing within a predetermined margin of error distance,
wherein in determining whether to register a golf shot when the current swing has occurred at the same location as the previous swing, the one or more processors are configured to select the data relating to the current swing as a last data stored in association with the determined position as the registered golf shot at the determined position,
wherein the processor is configured to automatically select the last data as the registered golf shot in response to a subsequent swing detection at a different location when a distance from the determined position to the different location is greater than the predetermined margin of error distance,
wherein the margin of error distance is determined in part on the golf club used to hit the golf shot at the determined position.

* * * * *